US012254733B2

(12) United States Patent
Oiyama

(10) Patent No.: US 12,254,733 B2
(45) Date of Patent: Mar. 18, 2025

(54) PAPER SHEET STORAGE HANDLING DEVICE

(71) Applicant: JAPAN CASH MACHINE CO., LTD., Osaka (JP)

(72) Inventor: Hiroyuki Oiyama, Osaka (JP)

(73) Assignee: JAPAN CASH MACHINE CO., LTD., Osaka (JP)

( * ) Notice: Subject to any disclaimer, the term of this patent is extended or adjusted under 35 U.S.C. 154(b) by 141 days.

(21) Appl. No.: 18/043,798

(22) PCT Filed: Jun. 9, 2021

(86) PCT No.: PCT/JP2021/021916
§ 371 (c)(1),
(2) Date: Mar. 2, 2023

(87) PCT Pub. No.: WO2022/049852
PCT Pub. Date: Mar. 10, 2022

(65) Prior Publication Data

US 2024/0021039 A1 Jan. 18, 2024

(30) Foreign Application Priority Data

Sep. 4, 2020 (JP) ................................ 2020-149075

(51) Int. Cl.
*G07D 11/00* (2019.01)
*B65H 29/46* (2006.01)
(Continued)

(52) U.S. Cl.
CPC ............ *G07D 11/16* (2019.01); *B65H 31/30* (2013.01); *G07D 11/125* (2019.01); *B65H 2701/1912* (2013.01); *G07D 2211/00* (2013.01)

(58) Field of Classification Search
CPC ...... G07D 11/16; G07D 11/125; G07D 11/12; G07D 11/13; B65H 2701/1912;
(Continued)

(56) References Cited

U.S. PATENT DOCUMENTS

2019/0360258 A1 11/2019 Uemizo et al.
2022/0343713 A1* 10/2022 Wei ........................ B65H 29/40

FOREIGN PATENT DOCUMENTS

JP S59-91578 A 5/1984
JP 2011-054063 A 3/2011
JP 2019-204206 A 11/2019

OTHER PUBLICATIONS

WIPO, Japan International Search Authority, International Search Report (with English translation) and Written Opinion mailed Jul. 20, 202 in International Patent Application No. PCT/JP2021/021916, 8 pages.

* cited by examiner

*Primary Examiner* — Luis A Gonzalez
(74) *Attorney, Agent, or Firm* — MASUVALLEY & PARTNERS; Peter Martinez

(57) ABSTRACT

A banknote storage handling device 300 includes a lid unit opening/closing mechanism 410 that moves a lid unit 170 to an open position by moving to a spaced position in a state where the lid body 171 is latched, a loading table 450 that is configured to receive and load paper sheet bundles Bs moved outward from a lateral opening by a paper sheet bundle moving member in accordance with movement of the lid unit to the open position when at a lifted standby position, and to be capable of being lowered from the standby position to a lowered position in a state where the paper sheet bundles are loaded thereon, and a loading table movement mecha-
(Continued)

nism 560 that moves the loading table located at the lowered position to a predetermined paper sheet bundle discharge position.

8 Claims, 21 Drawing Sheets

(51) Int. Cl.
*B65H 31/30* (2006.01)
*G07D 11/125* (2019.01)
*G07D 11/16* (2019.01)

(58) Field of Classification Search
CPC .... B65H 31/30; B65H 31/10; B65H 31/3063; B65H 31/22; B65H 31/18; B65H 2301/422542; B65H 2301/422548; B65H 2301/42264
See application file for complete search history.

PAPER SHEET STORAGE HANDLING DEVICE

RELATED APPLICATIONS

This application is the U.S. National Phase of and claims priority to International Patent Application No. PCT/JP2021/021916, International Filing Date Jun. 9, 2021, entitled Paper Sheet Storage Handling Device, which claims benefit of Japanese Application No. 2020-149075 filed Sep. 4, 2020, both of which are incorporated herein by reference in their entireties.

FIELD

The present invention relates to a paper sheet storage handling device that handles a paper sheet storage having paper sheets stored therein.

BACKGROUND

Conventionally, various measures are taken to prevent money from being illicitly taken out from a storage that has money accommodated therein.

Patent Literature 1 describes a system that automatically takes out paper sheets from a paper sheet storage without any contact with human hands. In this technique, paper sheets are taken out from the paper sheet storage by a robot arm controlled on the basis of image data obtained by imaging the state of the storage.

CITATION LIST

Patent Literature

Patent Literature 1: Japanese Patent Application Laid-open No. 2019-204206

SUMMARY

Technical Problem

However, since the system described in Patent Literature 1 uses the robot arm, the system is large.

The present invention has an object to provide a paper sheet storage handling device that can automatically take out paper sheets stored in a paper sheet storage with a simpler configuration.

Solution to Problem

In order to solve the above problem, a paper sheet storage handling device according to the present invention comprises: a receiving portion that removably receives a paper sheet storage having paper sheets stored therein in a stacked state; and a paper sheet bundle movement mechanism that moves paper sheet bundles, which are exposed by opening a lateral opening of the paper sheet storage in a state where the paper sheet storage received in the receiving portion is stopped at a predetermined paper sheet storage stop position, outward from the lateral opening, wherein the paper sheet storage includes a casing that has a paper sheet bundle storage void inside and that includes the lateral opening on one side face, a lid unit that opens and closes the lateral opening when moving back and forth in an inward/outward direction of the lateral opening, a loading plate that is always biased in a lifting direction to hold the paper sheet bundles in a stacked manner while being supported to be capable of being lifted and lowered in the paper sheet bundle storage void, and a driven mechanism that receives an external driving force for lowering the loading plate against a biasing force, the lid unit includes a lid body that moves back and forth between a closed position to close the lateral opening of the casing and an open position spaced outward from the lateral opening to open the lateral opening, and a paper sheet bundle moving member that is provided in a protruded manner from the lid body toward an inside of the lateral opening and that collectively moves the paper sheet bundles in the paper sheet bundle storage void from the lateral opening to outside the casing when moving outward along with the lid body, and the paper sheet bundle movement mechanism includes a lid unit opening/closing mechanism that moves back and forth between a spaced position spaced from the lid body of the paper sheet storage located in the receiving portion and an approaching position where the lid body is latched, and that moves the lid unit to the open position by moving to the spaced position in a state where the lid body is latched, a loading table that is configured to receive and load the paper sheet bundles moved by the paper sheet bundle moving member outward from the lateral opening in accordance with movement of the lid unit to the open position when at a lifted standby position, and to be capable of being lowered from the standby position to a lowered position in a state where the paper sheet bundles are loaded thereon, and a loading table movement mechanism that moves the loading table located at the lowered position to a predetermined paper sheet bundle discharge position.

Advantageous Effects of Invention

According to the present invention, it is possible to simplify and downscale a device related to automatic taking-out of paper sheets.

DESCRIPTION OF EMBODIMENTS

Figure 1:
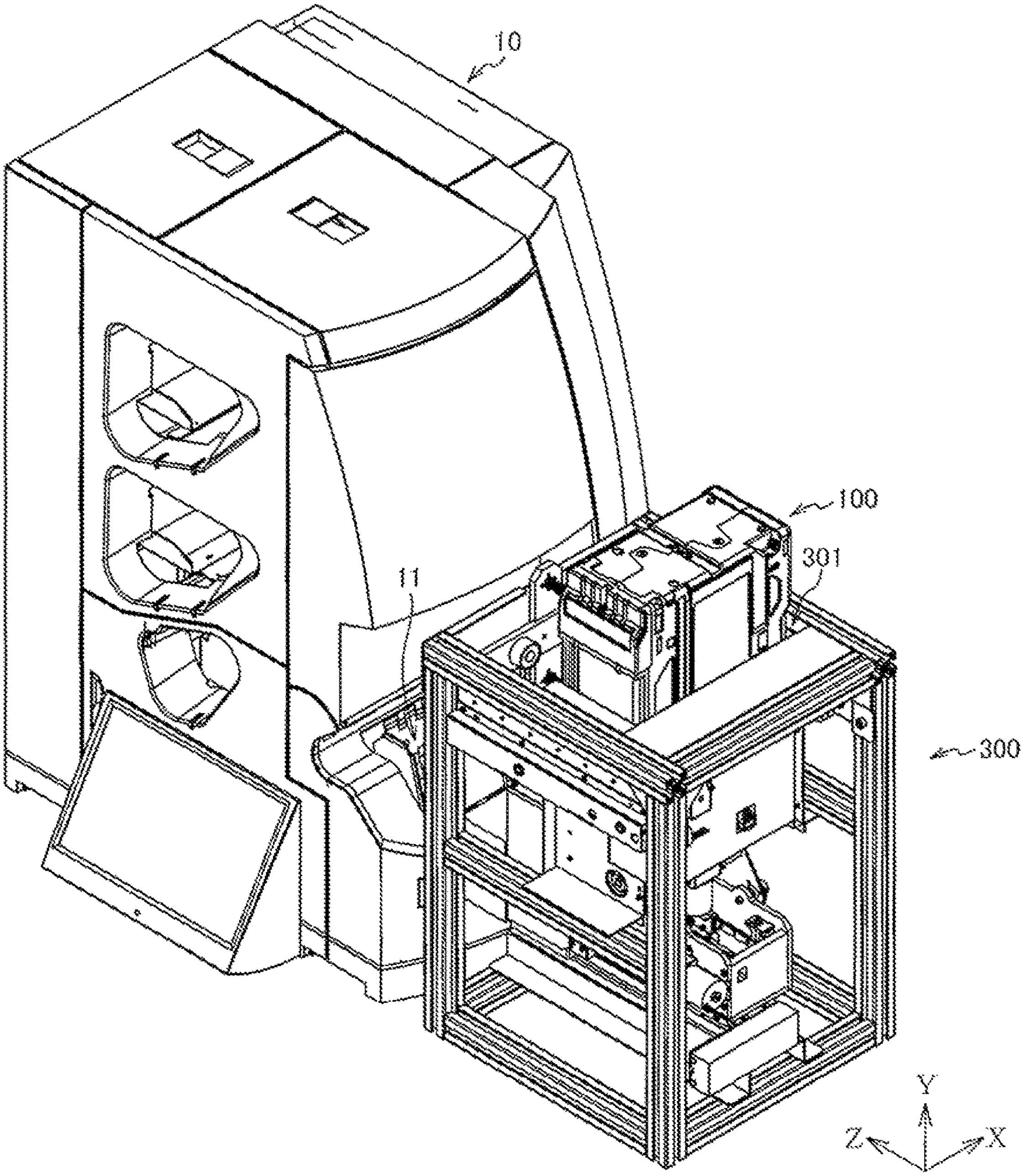
FIG. 1 is a perspective view illustrating an example of a use state of a banknote storage handling device.

The present invention will be explained in detail below by embodiments illustrated in the drawings. Note that constituent elements, types, combinations, shapes, and relative arrangements in the embodiments are not intended to limit the scope of the present invention solely thereto but are merely explanatory examples, unless otherwise specified.

The present invention is generally applicable to paper sheets including banknotes and securities. The present invention is explained below based on an example in which banknotes are handled as an example of the paper sheets.

[General Outline]

FIG. 1 is a perspective view illustrating an example of a use state of a banknote storage handling device.

A banknote storage handling device (a paper sheet storage handling device) 300 (hereinafter, simply “handling device 300”) is a device that takes out banknotes from a banknote storage (a paper sheet storage) 100 received in a receiving portion 301 while keeping the banknotes in a bundle (in a stacked state), and that transfers a taken-out banknote bundle (a paper sheet bundle) to a predetermined banknote bundle discharge position (a paper sheet bundle discharge position). The banknote bundle discharge position is a banknote inlet 11 of a banknote processing machine 10 that is arranged in front of the handle device 300, for example, to count the banknotes according to denominations and to process the banknotes. The handling device 300 takes out banknotes from the banknote storage 100 and transfers the banknotes to the banknote processing machine 100 without causing an operator to contact the banknotes.

In the following explanations, X, Y, and Z directions are defined as illustrated in FIG. 1. In the present example, the X direction is a direction in which the banknote storage 100 receives banknotes and is a direction (a first direction) along the long edge direction (first sides, long sides) of the banknotes. The Y direction is a direction in which the banknotes are stacked and is the upward/downward direction. The Z direction is a direction in which a banknote bundle is taken out from the banknote storage 100 and a direction in which the taken-out banknote bundle is transferred toward the banknote processing machine 10, and is a direction (a second direction) along the short edge direction (second sides, short sides) of the banknotes.

[Banknote Storage]

Figure 2B:
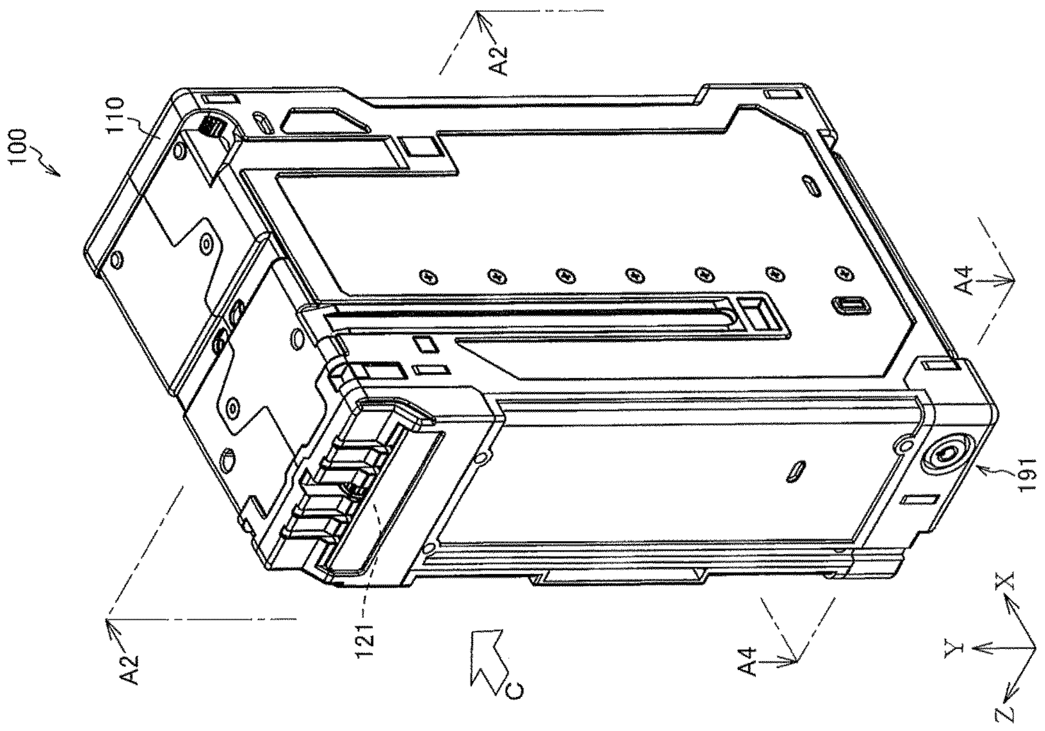
FIGS. 2(*a*) and 2(*b*) are perspective views illustrating an exterior appearance of a banknote storage.
Figure 2A:
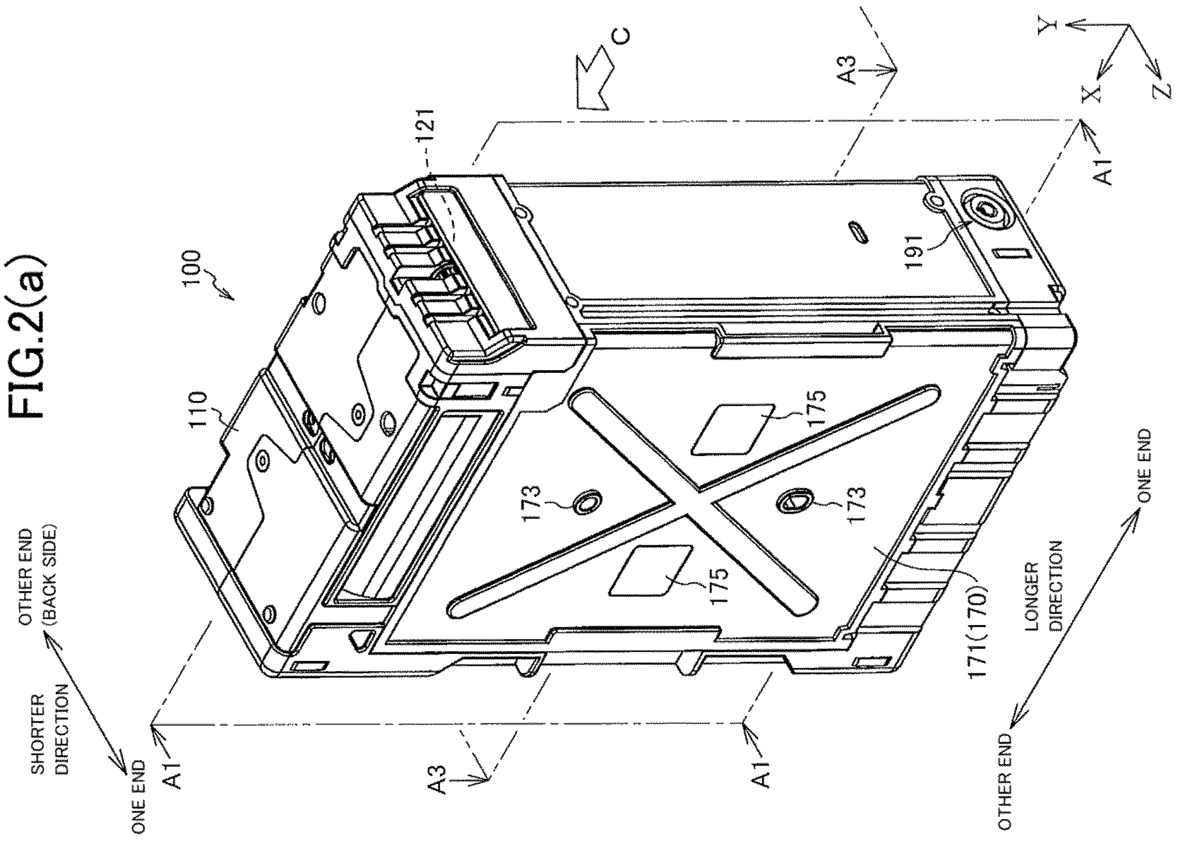
Figure 3:
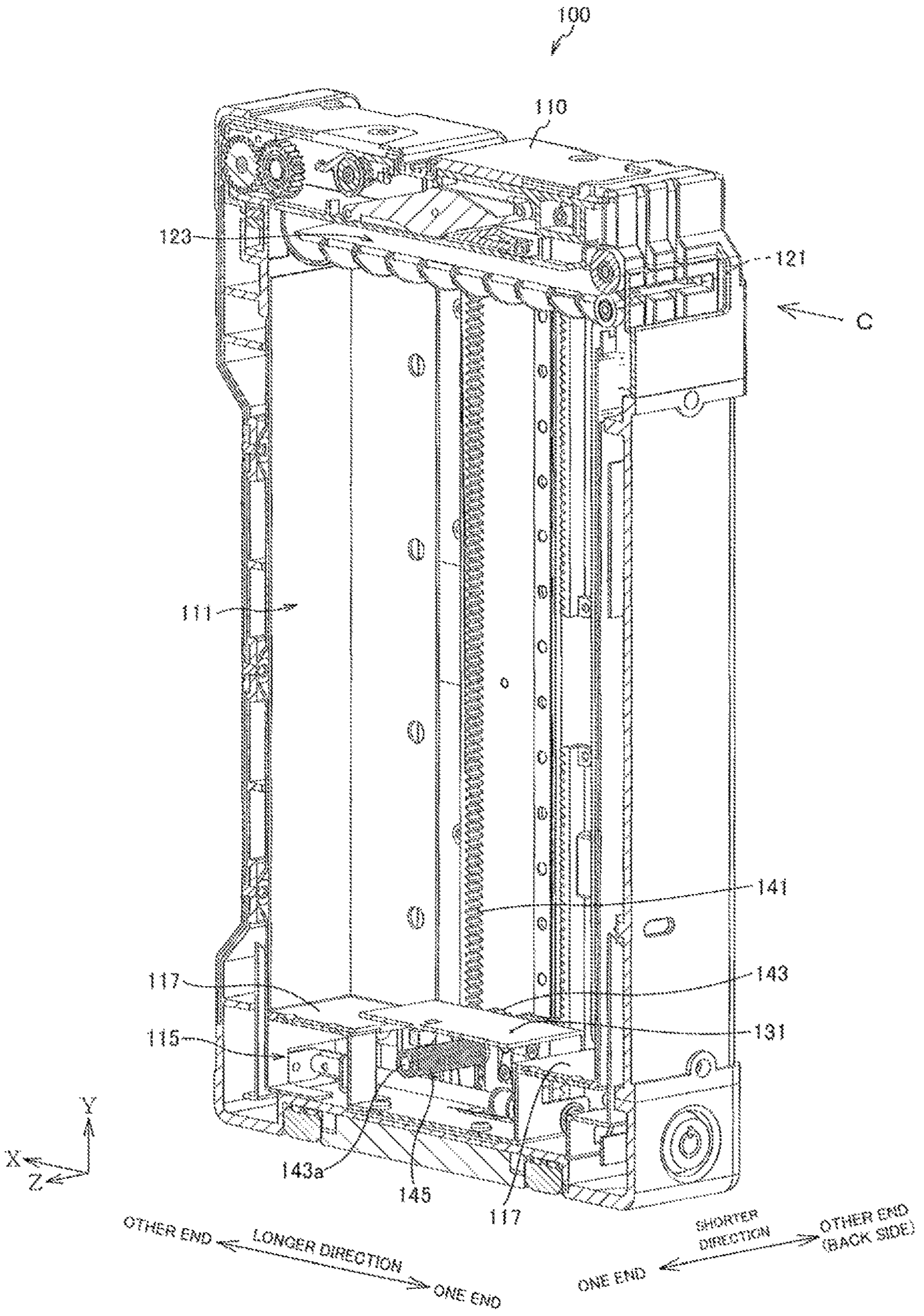
FIG. 3 is a sectional view along A1-A1 in FIG. 2(*a*).
Figure 4B:
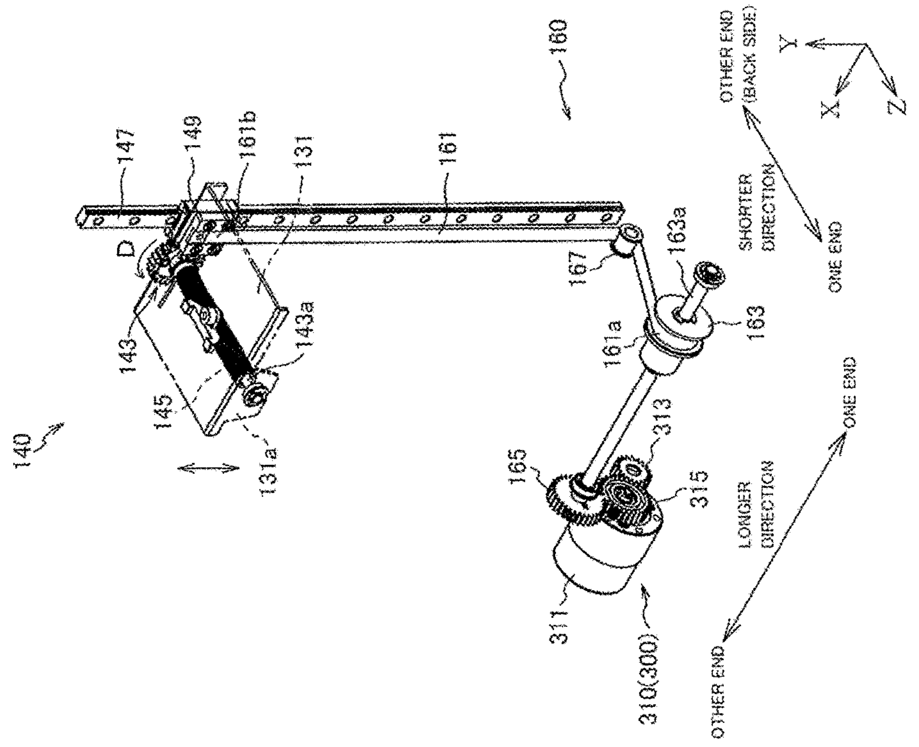
FIG. 4(*a*) is a sectional view along A2-A2 in FIG. 2(*b*) in a state where a lateral opening is opened, and FIG. 4(*b*) is a perspective view illustrating a relevant configuration of a loading plate advance/retract mechanism.
Figure 4A:
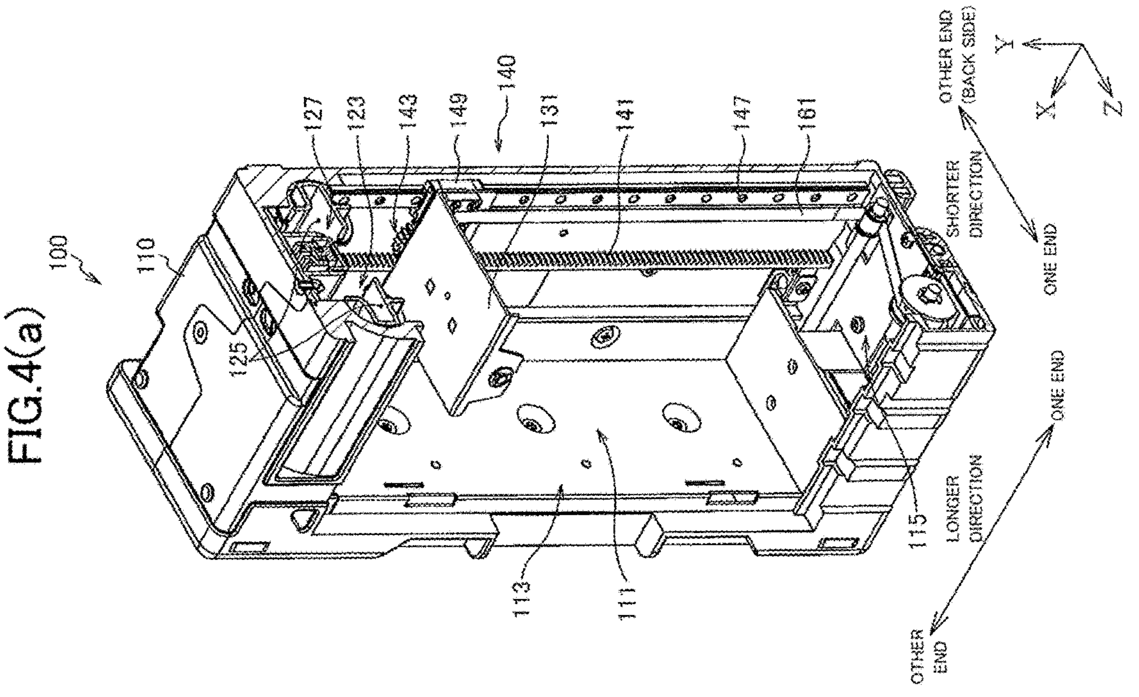

FIGS. 2(*a*) and 2(*b*) are perspective views illustrating an exterior appearance of the banknote storage. FIG. 3 is a sectional view along A1-A1 in FIG. 2(*a*). FIG. 4(*a*) is a sectional view along A2-A2 in FIG. 2(*b*) in a state where a lateral opening is opened, and FIG. 4(*b*) is a perspective view illustrating a relevant configuration of a loading plate advance/retract mechanism.

The banknote storage 100 is, for example, removably attached to a circulating banknote processor (not illustrated) and accommodates therein banknotes collected from the circulating banknote processor. The circulating banknote processor is installed on or placed next to a banknote handling device such as an automatic dispenser, a playing media dispenser in a game hall, a ticketing machine, a depositing/dispensing device, or a money changer, and performs processing of receiving banknotes and dispensing banknotes as changes or the like.

In the following explanations, directions along the long edge direction and the short edge direction of banknotes accommodated in the banknote storage 100 are assumed as the longer direction (the X direction) and the shorter direction (the Z direction) of the banknote storage, respectively.

The banknote storage 100 includes a casing 110 in a substantially box shape (a cuboid state) that has a banknote bundle storage void (a paper sheet bundle storage void) 111 being a space for storing banknote bundles therein and that includes a lateral opening 113 (FIGS. 4(*a*) and 5(*b*)) on one side face (one of the side faces in the shorter direction in this example), a lid unit 170 (see FIG. 5) that opens and closes the lateral opening 113 when moving back and forth in the inward/outward direction (the shorter direction in the drawings) of the lateral opening 113, a loading plate 131 that is always biased in a lifting direction to hold banknote bundles in a stacked manner while supported to be capable of moving up and down in the banknote bundle storage void 111, and a driven mechanism 160 that is subjected to an external driving force to lower the loading plate against the biasing force.

<Casing>

The banknote storage 100 includes a receiving port 121 that is formed to be open at an upper part of the casing 110 in a substantially box shape (a cuboid state) on the side of one end in the longer direction and that receives banknotes having been transported in the direction of an arrow C along the longer direction, a banknote set unit 123 (FIG. 4(*a*)) that stops the banknotes received therein along the direction of the arrow C from the receiving port 121 at a set position, and one pair of end support members 125 and 125 that support both ends in the width direction (the short edge direction) of the banknotes set (having stopped at the set position) in the banknote set unit 123.

The banknote storage 100 also schematically includes a pressing member 127 capable of moving back and forth, which is positioned on the side of the upper face of the banknotes in the banknote set unit 123 in an initial state (retracted state) and is brought to contact with an intermediate part of the banknote upper face in the width direction to push the banknotes downward when protruding downward beyond the banknote set position, and the loading plate 131 that is positioned in the banknote bundle storage void 111 below the banknote set unit 123 and that is elastically biased upward to be normally in pressure contact with the end support members 125 and 125 from below and to be capable of moving back and forth in the downward direction away from the end support members 125 and 125.

<<Banknote Loading Plate>>

As illustrated in FIG. 4, the loading plate 131 is supported by a loading plate advance/retract mechanism 140 to be capable of moving back and forth in the upward/downward direction in the banknote bundle storage void 111. The shape, the size, and the positional relation of the loading plate 131 are set to support the intermediate part of the banknotes in the long edge direction.

The loading plate advance/retract mechanism 140 schematically includes a rack gear 141 that is arranged on an inner face of a side plate located on the side (the back side) of the other end of the casing 110 in the shorter direction (the Z direction) to extend in the upward/downward direction, a pinion gear 143 that is arranged on the back side of the loading plate 131 to mesh with the gear part of the rack gear 141, a coil spring 145 that elastically biases a rotation shaft 143*a* of the pinion gear 143 in one rotation direction (in the direction of an arrow D in the drawing), a guide rail 147 that is arranged on the inner face of the side plate located on the back side of the casing 110 to extend in parallel to the rack gear 141, a slider 149 that is arranged on the back side of the loading plate 131 to move back and forth (lift and lower) on the guide rail 147, a constant load spring 161 that has one end 161*a* in the longer direction fixed to be retractable around a drum 163 arranged in a lower end space 115 (see FIGS. 3 and 4) positioned below the banknote bundle storage void 111 and that has the other end 161*b* in the longer direction fixed to the slider 149, and a driven gear 165 that is attached to an end (the other end in the longer direction in the present example) of a rotation shaft 163*a* of the drum 163 extending in the longer direction of the casing 110 to coaxially and integrally rotate with the drum 163.

The rack gear 141 and the guide rail 147 extend from a location close to the end support members 125 and 125 to a location near a lower end in the casing 110. The pinion gear 143 is pivotally supported by gear support portions 131*a* respectively formed on both ends in the shorter direction of the loading plate 131. The coil spring 145 is a torsion coil spring and biases the pinion gear 143 to be rotated in a direction (the direction of the arrow D in the drawing) in which the pinion gear 143 moves the loading plate 131 in the upward direction where the end support members 125 and 125 are located. The slider 149 is arranged adjacently to the rack gear 141 and is fixed to the loading plate 131.

The drum 163 is arranged at one end of the lower end space 115 of the casing 110 in the shorter direction and freely rotates in forward and reverse directions. The constant load spring 161 is a long plate spring that is caused to be prone to curve in the longer direction with a constant curvature. The constant load spring 161 constantly generates a constant rewinding force (load) irrespective of a pullout amount of the spring from the drum 163. The constant load spring 161 is supported at an intermediate part in the longer direction by a roller 167 arranged on a lower back side in the casing 110. Therefore, the constant load spring 161 extends along the slider 149 in the banknote bundle storage void 111. The driven gear 165 meshes with a transmission gear 315 of an external driving mechanism 310 included on the side of the handling device 300 through an opening formed on the casing 110, and at least a driving force moving the loading plate 131 in the downward direction away from the end support members 125 and 125 is transmitted to the driven gear 165.

Figure 6:
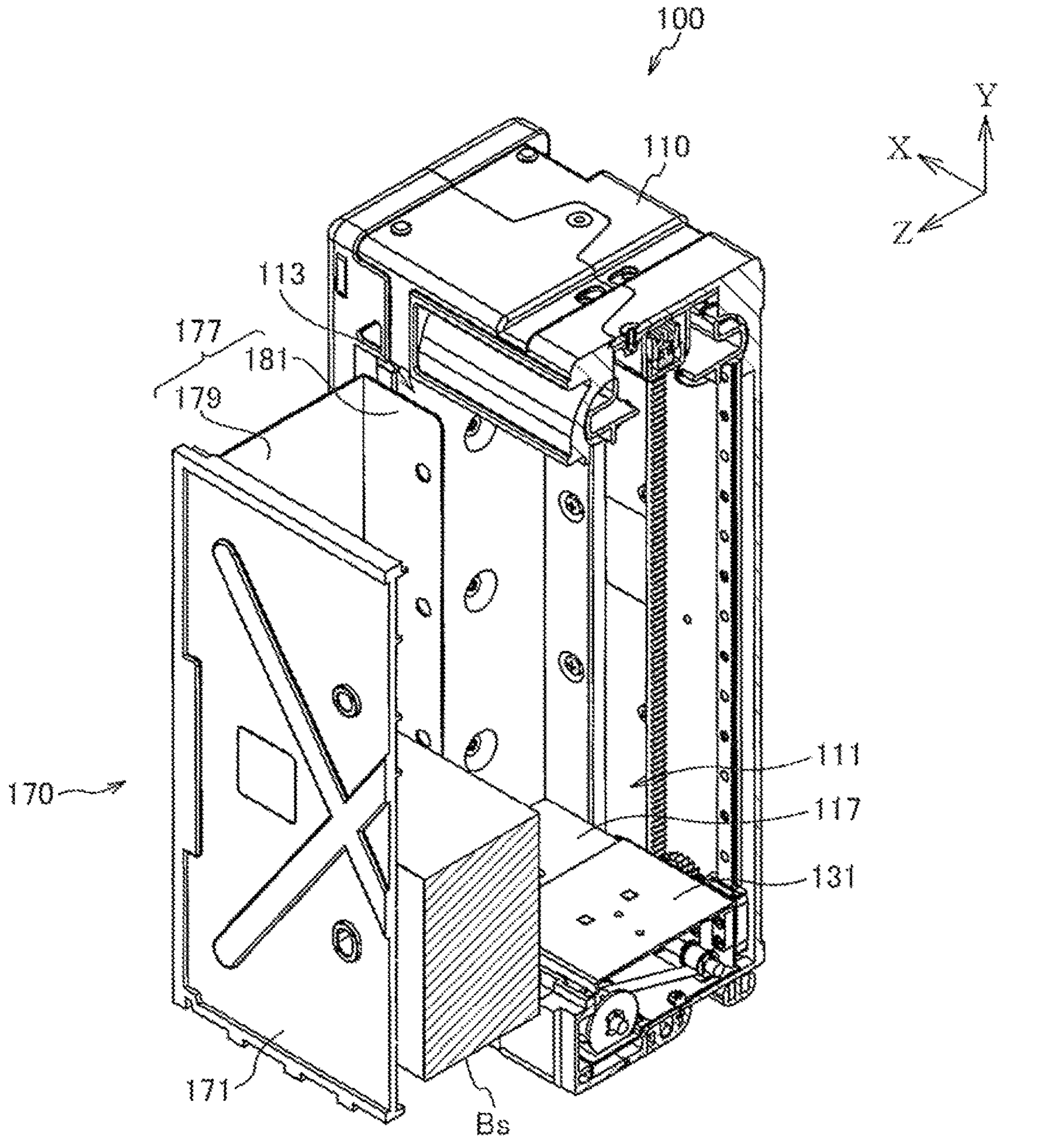
FIG. 6 is a view corresponding to the sectional view along A2-A2 in FIG. 2(*b*) in the state where the lid unit (the lid body) is moved to the open position illustrated in FIG. 5(*b*).

As illustrated in FIG. 3, a pair of partition plates 117 and 117 that separate the banknote bundle storage void 111 and the lower end space 115 from each other in the upward/downward direction are arranged at both ends in the longer direction positioned in the lowermost part of the banknote bundle storage void 111, respectively. The upper faces of the partition plates 117 and 117 are set at a location lower than the most lowered position of the loading plate 131 as illustrated in FIG. 6, and restrict (define) the lower limit position of the both ends of the banknote bundles in the long edge direction when the loading plate 131 loading the banknote bundles in a state being in contact with the lower face of an intermediate part of the banknote bundles in the long edge direction is most lowered.

<<Loading Plate Advance/Retract Mechanism>>

The constant load spring 161, the drum 163, and the driven gear 165 constitute the driven mechanism 160 that lowers the loading plate 131. The driven mechanism 160 is driven by receiving an external driving force from the external driving mechanism 310 installed outside the banknote storage 100.

The handling device 300 includes the external driving mechanism 310 that couples to the driven mechanism 160 to transmit the external driving force thereto when the banknote storage 100 is at a predetermined banknote storage stop position (a paper sheet storage stop position).

Figure 9B:
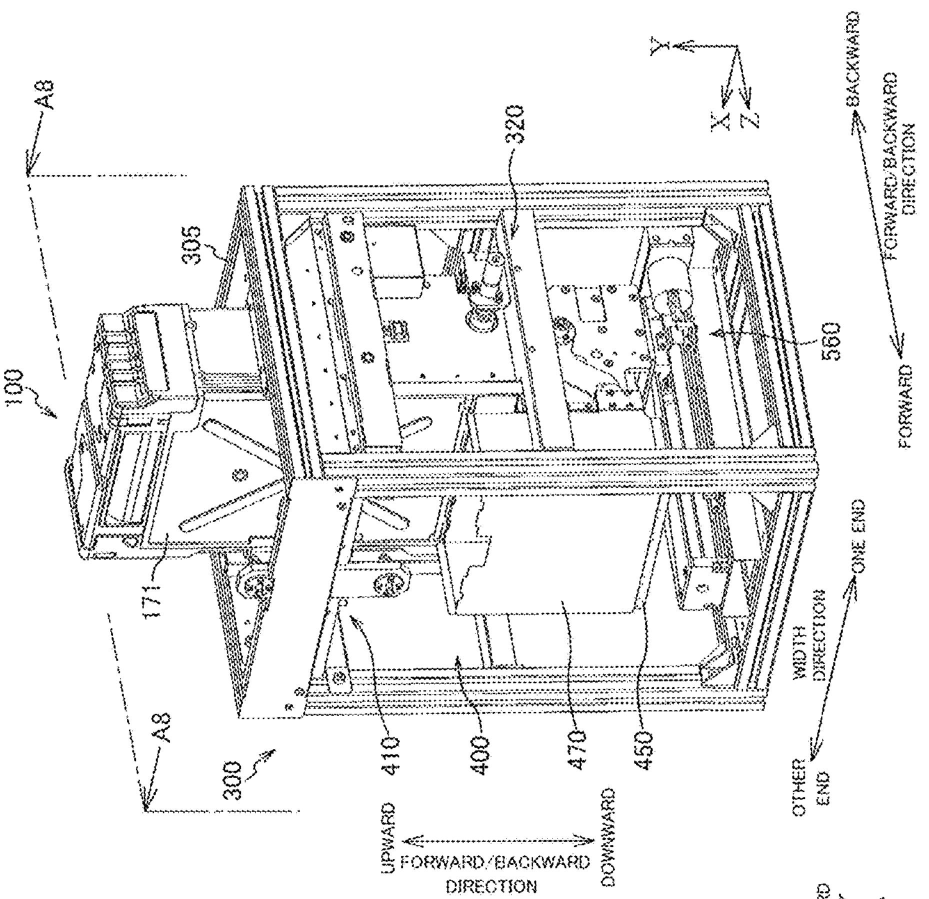
FIG. 9 are perspective views illustrating a schematic configuration of the banknote storage handling device, where (a) illustrates a state before attaching the banknote storage and (b) illustrates a state where the banknote storage is attached.
Figure 9A:
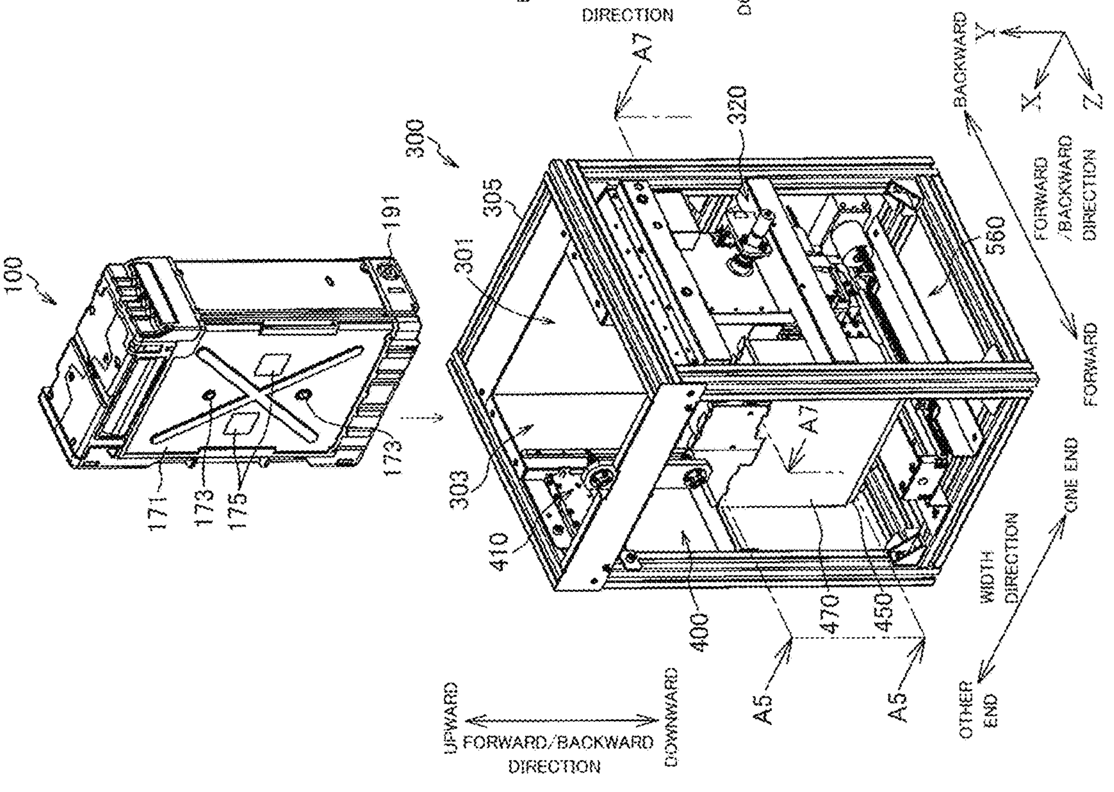

The banknote storage stop position is a position where the handling device 300 stops the banknote storage 100 received in the receiving portion 301 (FIGS. 1, 9, and the like). The external driving mechanism 310 includes a driving motor 311, a driving gear 313 attached to a driving shaft of the driving motor 311, and a transmission gear 315 that meshes with the driving gear 313.

The transmission gear 315 engages (couples) with the driven gear 165 via the opening that is formed through the bottom face of the casing 110 when the banknote storage 100 is at the banknote storages stop position. The driving motor 311 generates the driving force for lowering the loading plate 131 against the biasing force of the coil spring 145.

The loading plate 131 normally brings the stacked banknotes to pressure contact with the end support members 125 and 125 and holds the banknotes with the biasing force of the coil spring 145. That is, the loading plate 131 compressively holds the banknotes between the upper face of the loading plate 131 that supports the lower face of the intermediate part of the banknotes in the long edge direction and the lower faces of the end support members 125 and 125. When the transmission gear 315 meshes with the driven gear 165, the driving force from the driving motor 311 is transmitted to the driven gear 165 via the driving gear 313 and the transmission gear 315, so that the loading plate 131 is lowered.

<Lid Unit>

Figures 5A, 5B:
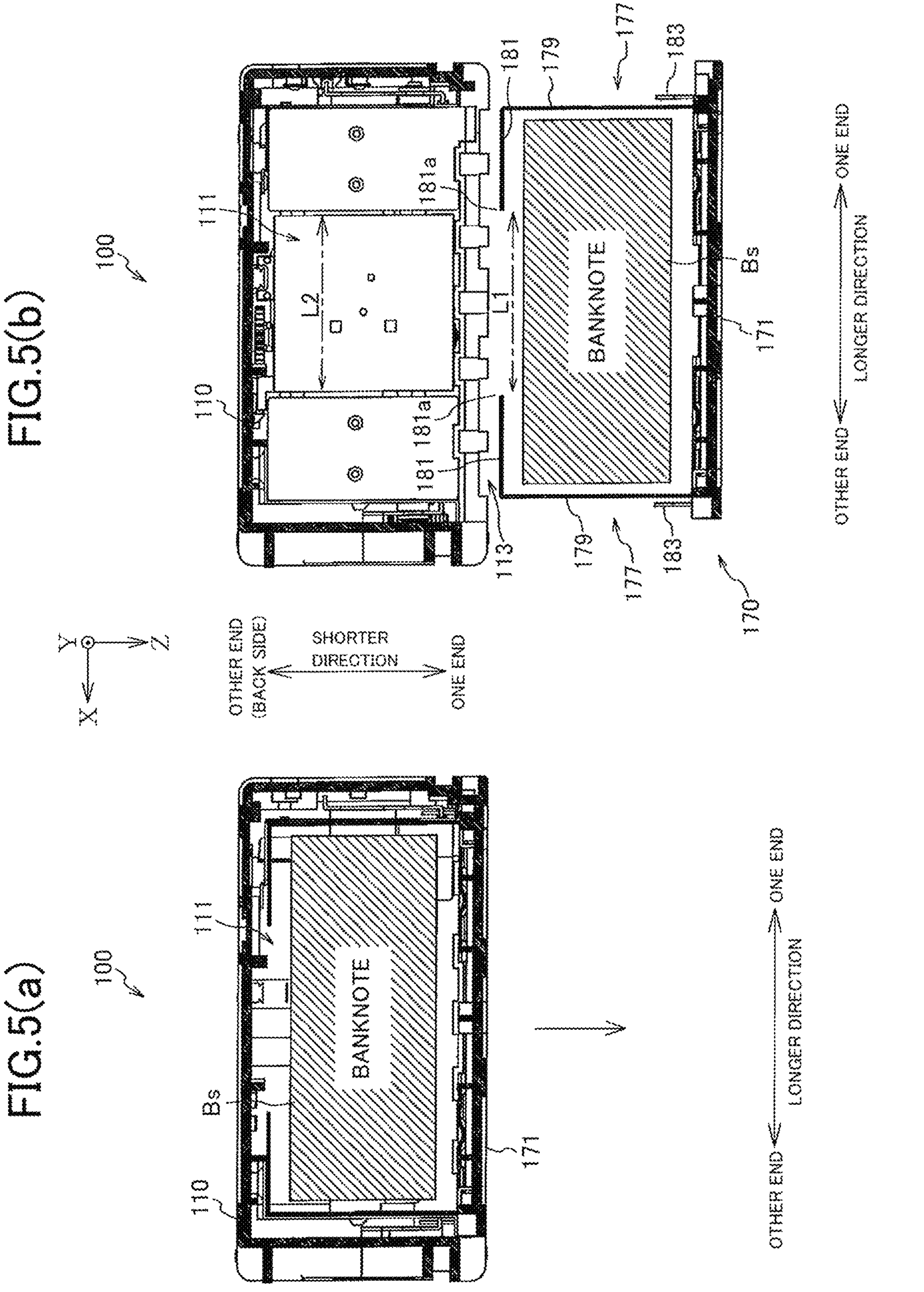
FIG. 5 are views corresponding to a sectional view along A3-A3 in FIG. 2(*a*), where (a) illustrates a state where a lid unit (a lid body) is at a closed position and (b) is a view illustrating a state where the lid unit (the lid body) is at an open position.

FIG. 5 are views corresponding to a sectional view along A3-A3 in FIG. 2(*a*), where (a) illustrates a state where the lid unit (a lid body) is at the closed position and (b) is a view illustrating a state where the lid unit (the lid body) is at the open position. FIG. 6 is a view corresponding to the sectional view along A2-A2 in FIG. 2(*b*) in the state where the lid unit (the lid body) is moved to the open position illustrated in FIG. 5(*b*).

The lid unit 170 includes a lid body 171 moving back and forth between the closed position where the lateral opening 113 of the casing 110 is closed and the open position to be spaced outward from the lateral opening to open the lateral opening, and banknote bundle moving members (paper sheet bundle moving members) 177 and 177 that are installed in a protruded manner from the lid body 171 toward the inside of the lateral opening 113 and that collectively move the banknote bundles in the banknote bundle storage void 111 from the lateral opening 113 to outside the casing 110 when moving outward along with the lid body 171.

The lid body 171 has a substantially rectangular flat plate shape that closes the lateral opening 113 in a substantially rectangular shape.

<<Banknote Bundle Moving Members>>

The banknote bundle moving members 177 and 177 are installed in a protruded manner from locations near the ends in the longer direction of the lid body 171 toward inside, respectively. Each of the banknote bundle moving members 177 has a substantially L-shape in plan view and includes a plate-like guide part 179 protruded toward inside from the location near the end in the longer direction of the lid body 171, and a plate-like pressing part 181 that extends to be folded from the distal end of the guide part 179 toward the other end in the longer direction. The banknote bundle moving members 177 and 177 extend almost entirely in the upward/downward direction of the banknote bundle storage void 111, that is, from immediately below the end support members 125 and 125 to a location immediately above the partition plates 117 and 117. Banknote bundles Bs are held in a space surrounded by the lid body 171 and the banknote bundle moving members 177 and 177.

The inner face of the lid body 171 restricts the position of one end face of the banknote bundles Bs extending in the long edge direction. Each of the guide parts 179 restricts the position of each edge face of the banknote bundles Bs extending in the short edge direction. Each of the pressing parts 181 restricts the position of the other edge face of the banknote bundles Bs extending in the long edge direction and presses the other end face of the banknote bundles Bs extending in the long edge direction outward to move the banknote bundles Bs being kept in the stacked state to outside the banknote bundle storage void 111 when the lid body 171 moves from the closed position to the open position.

The height direction position of the lower end edges of the banknote bundle moving members 177 is set to be lower than the upper face of the loading plate 131 lowered to the lowermost position. A length L1 of a gap formed between the inner ends of distal end edges 181*a* and 181*a* of the banknote bundle moving members 177 and 177 is slightly longer than a length L2 of the loading plate 131 in the longer direction. Accordingly, the banknote bundle moving members 177 and 177 do not disturb lifting and lowering of the loading plate 131 and are extracted outward without interfering with the loading plate 131.

<<Configuration Related to Locking/Unlocking>>

Figure 7B:
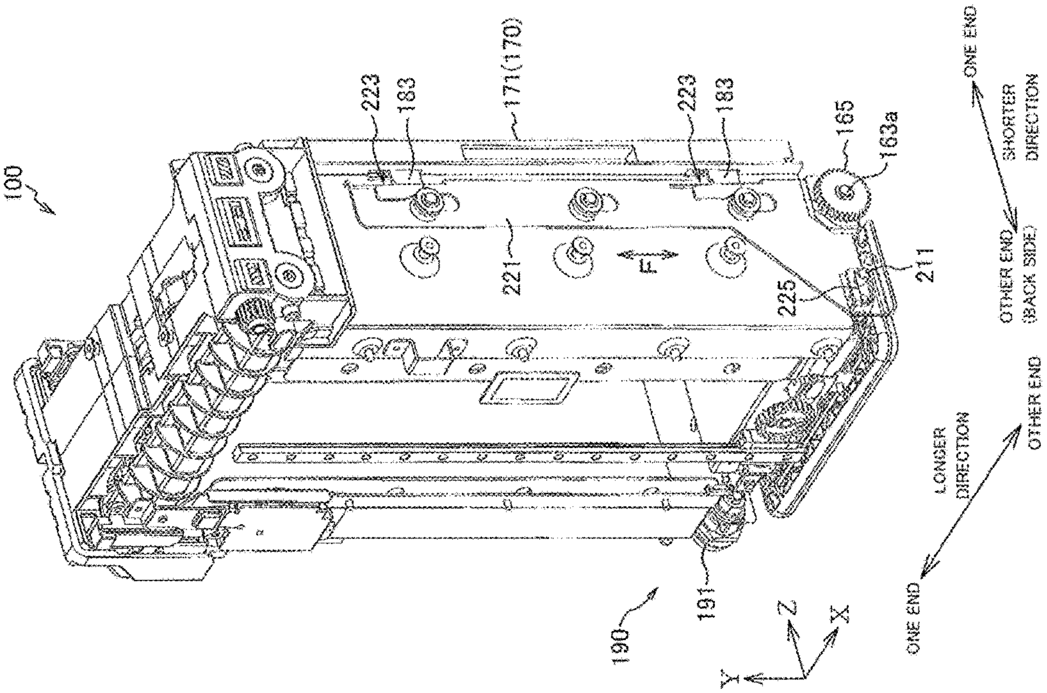
FIGS. 7(*a*) and 7(*b*) are perspective views illustrating a configuration related to locking and unlocking of a banknote storage in an exposed manner.
Figure 7A:
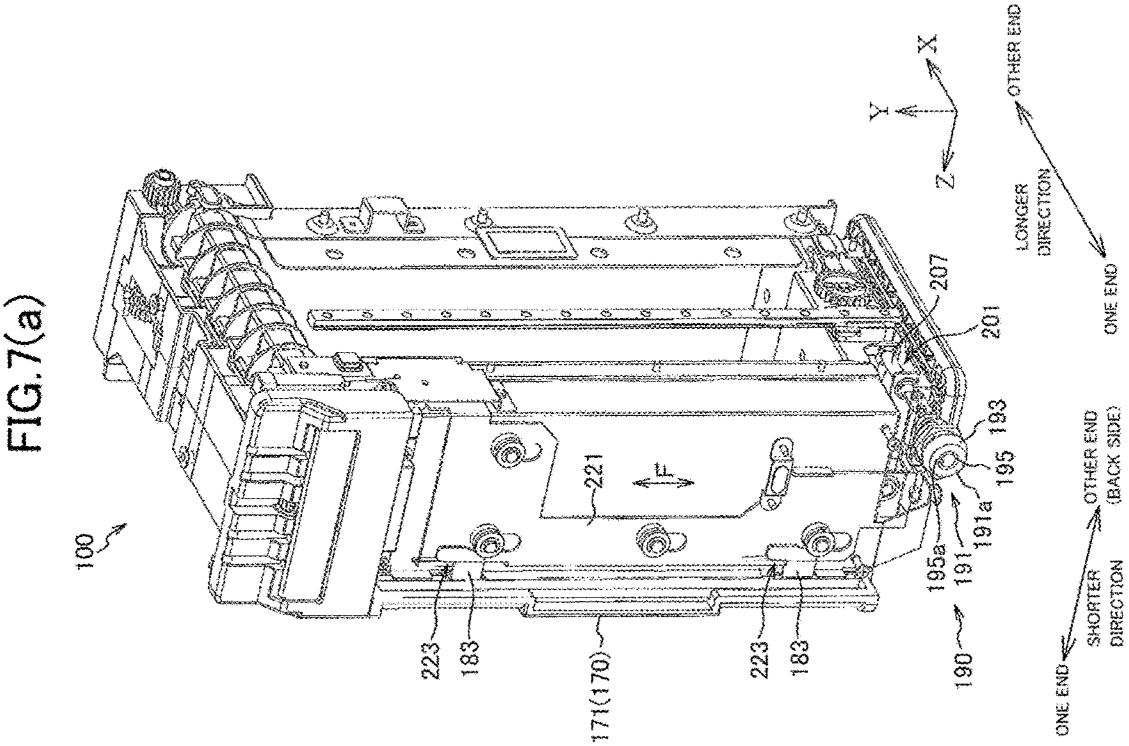

Latched clicks 183 and 183 for unopenably locking the lid body 171 to the casing 110 at the closed position and openably unlocking the lid body 171 are formed at outer positions in the longer direction than the banknote bundle moving members 177 and 177 on the inside face of the lid body 171, respectively, to be protruded inward. As illustrated in FIG. 7, a total of four latched clicks 183 are provided on an upper part and a lower part at the ends of the lid body 171 in the longer direction, respectively. The latched clicks 183 have a hook shape protruded toward the inside of the lateral opening. The latched clicks 183 are latched by lock plates 221 and 221 (see FIG. 7) arranged on one end side and the other end side of the casing 110 in the longer direction, respectively.

A locking/unlocking unit 190 that locks or unlocks the lock plates 221 and the lid body 171 will be described later.

<<Configuration of Lid Body Surface>>

As illustrated in FIG. 2 and the like, the lid body 171 includes upper and lower two latched holes 173 and 173 to be latched by a lid unit opening/closing mechanism 410 (FIG. 9) provided on the handling device 300, and right and left two stuck portions 175 and 175 to be stuck by the lid unit opening/closing mechanism 410, on an outer face.

The latched holes 173 and 173 are arranged at an intermediate part of the lid body 171 in the longer direction to be spaced from each other in the upward/downward direction. The stuck portions 175 and 175 are arranged at an intermediate part of the lid body 171 in the upward/downward direction to be spaced from each other in the longer direction.

In the present example, the lid unit opening/closing mechanism 410 includes electromagnets as sticking units that stick to the stuck portions 175 and 175, respectively. Each of the stuck portions 175 and 175 is constituted of, for example, a ferromagnetic body (a soft magnetic body) such as an iron plate as a magnetic body that sticks to the electromagnet due to a magnetic force. The electromagnet is an example of the sticking unit. The method in which the lid unit opening/closing mechanism 410 sticks to the lid body 171 is not limited to that using a magnetic force.

<Locking/Unlocking Unit>

Figure 8:
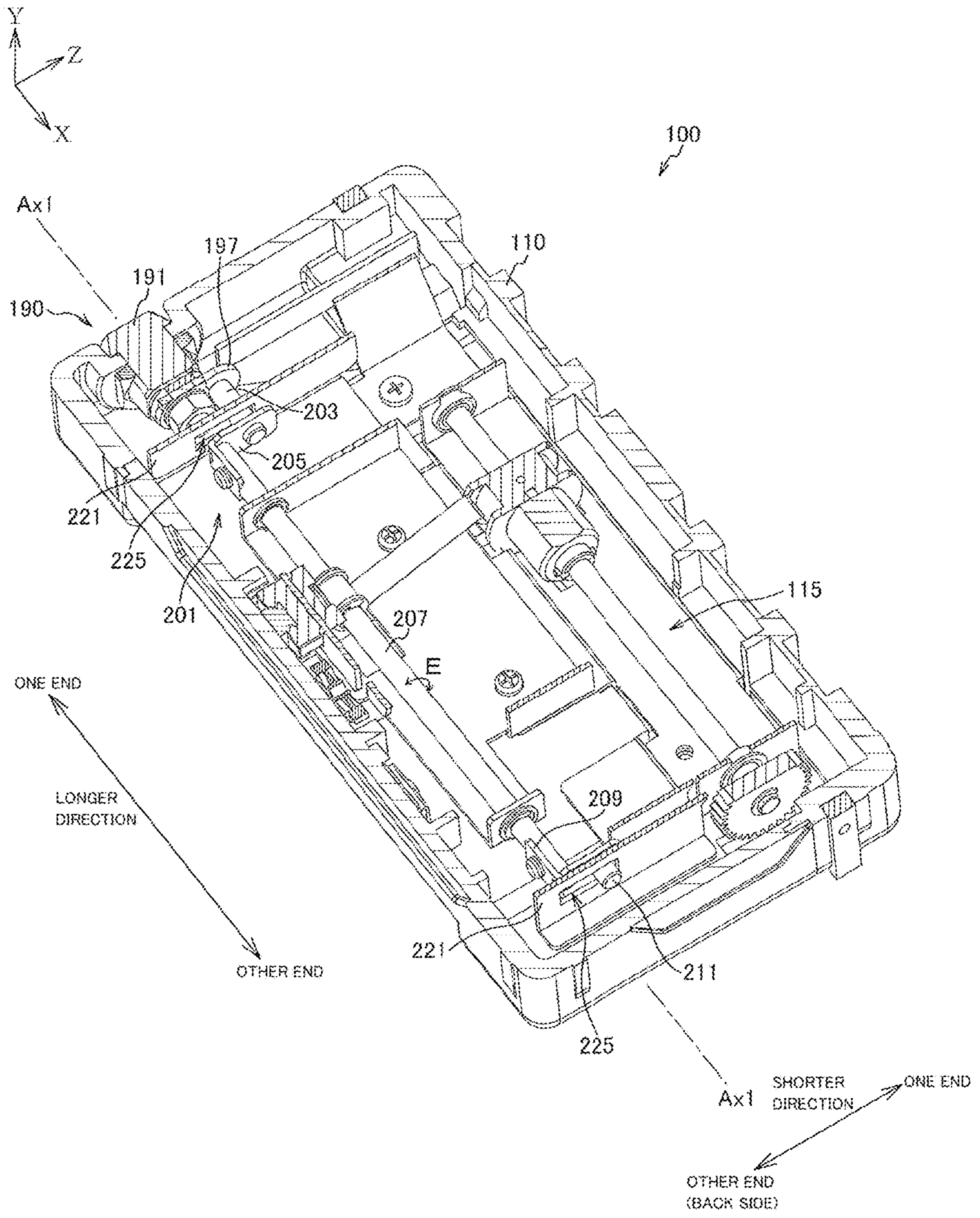
FIG. 8 is a perspective view corresponding to a sectional view along A4-A4 in FIG. 2(*b*).

FIGS. 7(*a*) and 7(*b*) are perspective views illustrating a configuration related to locking and unlocking of the banknote storage in an exposed manner. FIG. 8 is a perspective view corresponding to a sectional view along A4-A4 in FIG. 2(*b*).

The banknote storage 100 includes the locking/unlocking unit 190 that unopenably locks the lid body 171 or openably unlocks the lid body 171.

The locking/unlocking unit 190 includes a lock 191 that is provided on one face of the banknote storage 100 to perform a locking/unlocking operation for the banknote storage 100, an actuating member 201 (FIG. 8) that is actuated according to shifting in the attitude of a cam piece 197 (FIG. 8) provided on the lock 191, and the lock plates 221 and 221 (FIG. 7) that are respectively arranged on one end side and the other end side of the casing 110 in the longer direction and that lift or lower according to the operation of the actuating member 201 to latch or unlatch the latched clicks 183 provided on the lid body 171.

In the present example, the lock 191 is arranged below one end of the banknote storage 100 in the longer direction. The actuating member 201 is arranged in the lower end space 115. The lock plates 221 and 221 are arranged on side faces on the short sides of the banknote storage 100, respectively.

<<Lock>>

The lock 191 includes an engaged portion 193 exposed on the outside of the casing 110, a keyhole 195 formed from the front end face of the engaged portion 193 toward the back side, and a rotating body (not illustrated) and the cam piece 197 (FIG. 8) that rotate integrally with a key 331 (see FIG. 10) inserted from the keyhole 195. The lock 191 illustrated in the present example is a tubular pin tumbler lock and has a substantially cylindrical keyhole. A guide groove 195*a* extending in the direction of the axis is formed on an outer circumferential part of the keyhole 195.

The engaged portion 193 has a frustum shape with the outer diameter gradually increasing from a face (the front end face) where the keyhole 195 is formed toward the insertion direction of the key 331 (toward the back side of the lock 191). The engaged portion 193 illustrated in the present example has a circular truncated cone shape. The cam piece 197 is a plate cam attached to the rotating body to position a rotation center axis Ax1 of the lock 191 (FIG. 8) at one end in the longer direction. The rotation center axis Ax1 of the lock 191 is same as the center axis of the rotating body incorporated in the lock 191. The cam piece 197 rotates on the rotation center axis Ax1 integrally with the rotating body. The cam piece 197 shifts the attitude between a lock attitude where the lid body 171 can be locked and an unlock attitude where the lid body 171 can be unlocked according to rotation of the key 331 inserted from the keyhole 195 and the rotating body. The cam piece 197 faces, for example, a horizontal 0-degree direction when taking the lock attitude and faces, for example, a vertical 90-degree direction when taking the unlock attitude. FIG. 8 illustrates a state where the cam piece 197 faces the horizontal 0-degree direction.

<<Actuating Member>>

The actuating member 201 includes a pin 203 protruded in the direction of the backside (toward the other short side of the casing 110) from the other end in the longer direction of the cam piece 197, a substantially L-shaped coupling piece 205 having one end attached to the pin 203, a transmission shaft 207 having one end in the axial direction fixed to the other end of the coupling piece 205 to extend in the longer direction of the casing 110, a substantially L-shaped coupling piece 209 having one end fixed to the other end of the transmission shaft 207 in the axial direction, and a pin 211 attached to the other end of the coupling piece 209 to be protruded in the backside direction (toward the other short side of the casing 110).

The pins 203 and 211 are arranged on a same axis, and respectively engage with the lock plates 221 and 221 and lift and lower the lock plates 221 and 221 when turned on the transmission shaft 207 in the upward/downward direction (see arrows E in FIG. 0.8). The transmission shaft 207 is arranged coaxially with the rotation center axis Ax1 of the lock 191 and rotates integrally with the rotating body incorporated in the lock 191. The coupling pieces 205 and 209 and the transmission shaft 207 transmit the rotating operation of the rotating body and the cam piece 197 positioned on one end side of the casing 110 in the longer direction to the pin 211 arranged on the other end side of the casing 110 in the longer direction.

<<Lock Plates>>

The lock plates 221 and 221 (latch members) are arranged on both ends of the casing 110 in the longer direction, respectively. Each of the lock plates 221 is arranged on the side of the lateral opening 113 and includes latch portions 223 (FIGS. 7(*a*) and 7(*b*)) that latch or unlatch the associated latched clicks 183 provided on the lid body 171, and a long hole 225 formed through the lower end and extending in the horizontal direction.

The long holes 225 and 225 of the lock plates 221 and 221 allow the pins 203 and 211 (FIG. 8) to pass through, respectively. The long holes 225 and 225 convert the rotations of the pins 203 and 211 on the rotation center axis Ax1 of the lock 191 into an operation of lifting and lowering the lock plates 221 and 221 as indicated by arrows F in FIG. 7.

The lock plates 221 and 221 shift between a latch position (a position illustrated in FIG. 7) where the lock plates 221 and 221 are lowered to enable the latch portions 223 to latch the latched clicks 183, respectively, and an unlatch position where the lock plates 221 and 221 are lifted to enable the latch portions 223 to unlatch the latched clicks 183. The two lock plates 221 and 221 work together by transmission of the operation of the cam piece 197 from the actuating member 201.

<<Operation>>

When the cam piece 197 (FIG. 8) of the lock 191 takes the lock attitude in a state where the lid body 171 closes the lateral opening 113, the lock plates 221 and 221 take the latch attitude in which the latch portions 223 latch the latched clicks 183 (FIG. 8), and the lid body 171 unopenably locks the lateral opening 113.

When the key 331 is inserted into the lock 191 and the cam piece 197 of the lock 191 shifts to the unlock attitude, the lock plates 221 and 221 shift to the unlatch attitude in which the latch portions 223 do not latch the latched clicks 183 and the lid body 171 openably unlocks the lateral opening 113.

[Banknote Storage Handling Device]

FIGS. 9 are perspective views illustrating a schematic configuration of the banknote storage handling device, where (a) illustrates a state before receiving the banknote storage and (b) illustrates a state where the banknote storage is received.

The handling device 300 includes the receiving portion 301 (as a space) for removably receiving the banknote storage 100 in which banknotes are stored in a stacked state, a locking/unlocking device 320 that locks or unlocks the lock 191 of the banknote storage 100 in a state where the banknote storage 100 received in the receiving portion 301 is stopped at a predetermined position, a banknote bundle movement mechanism (a paper sheet bundle movement mechanism) 400 that moves banknote bundles exposed by opening the lateral opening 113 of the banknote storage 100 to the outside from the lateral opening 113 to move the banknote bundles to a predetermined banknote bundle discharge position, and a frame body 305 in a substantially cuboid shape that forms a space for accommodating these components.

It is assumed in the following explanations that the X direction along the longer direction of the banknote storage 100 is the width direction, the Z direction along the shorter direction of the banknote storage 100 is the depth direction (the forward/backward direction), and the Y direction is the upward/downward direction <Receiving Portion>

The receiving portion 301 is arranged on an upper part at the back of the handling device 300. The receiving portion 301 receives the banknote storage 100 inside from an upper face opening 303 that is an opening formed on one face (the upper face in the present example) of the handling device 300 and stops the banknote storage 100 at a predetermined position (the paper sheet storage stop position) illustrated in FIG. 9(*b*). The banknote storage 100 is set in the receiving portion 301 in such a manner that the lid body 171 faces forward, that is, the side of the banknote bundle discharge position.

<Locking/Unlocking Device>

Figure 10:
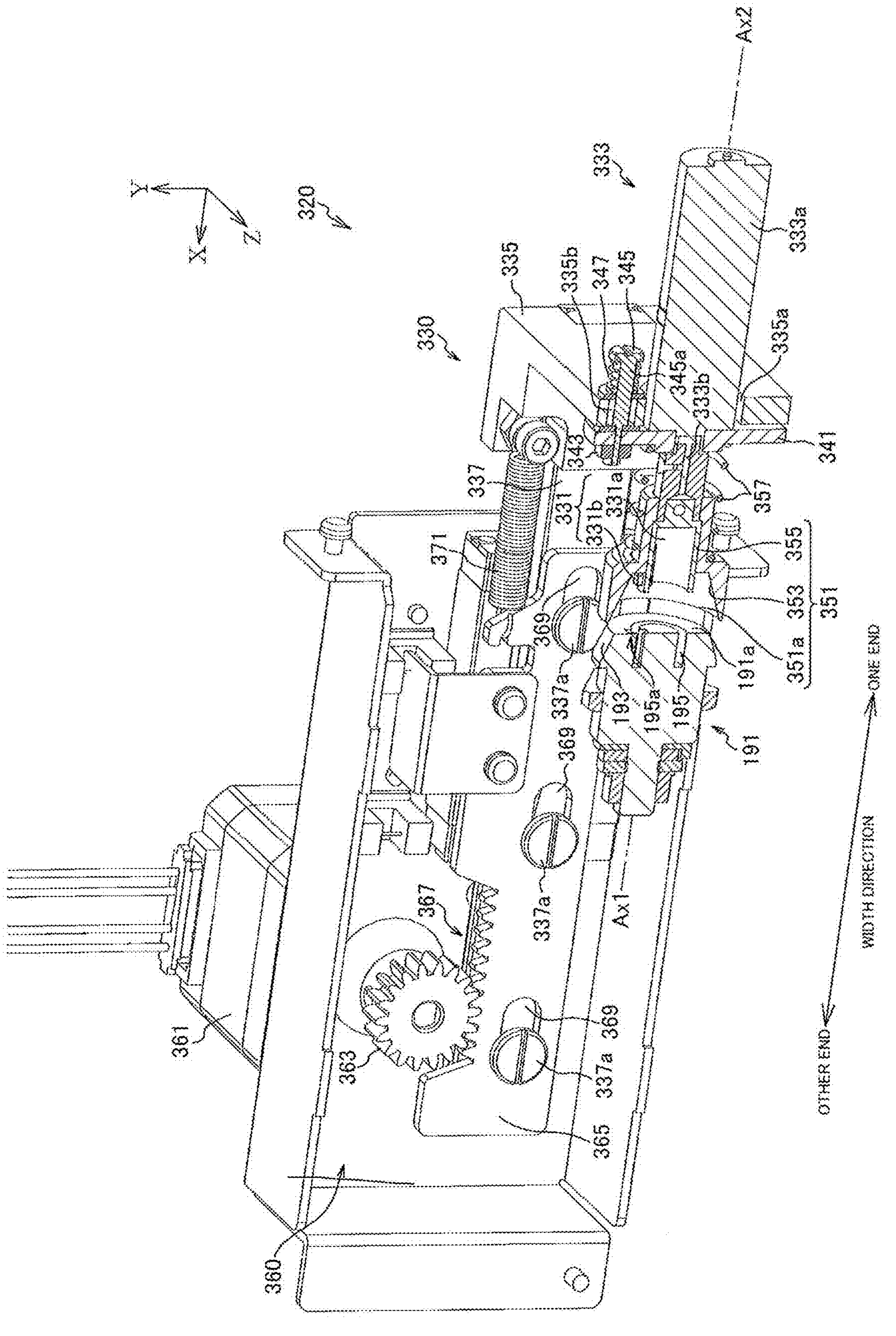
FIG. 10 is a perspective view illustrating a locking/unlocking device.
Figure 11A:
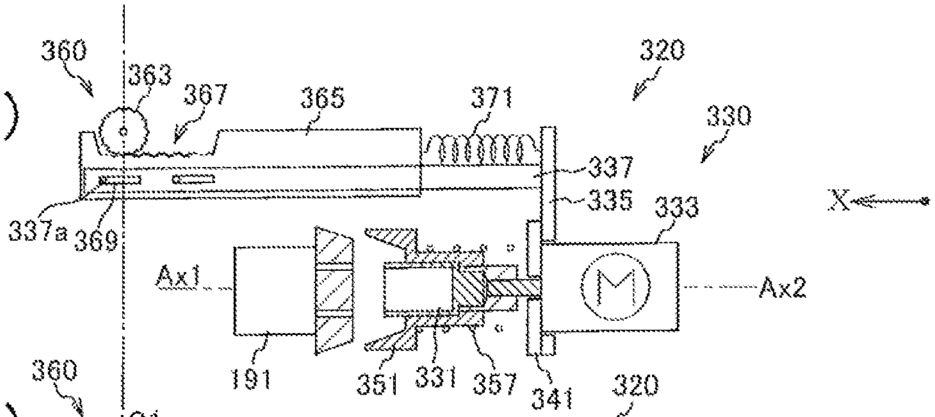
FIGS. 11(*a*) to 11(*e*) are schematic diagrams for explaining a sequence of operations related to locking and unlocking of a lock by the locking/unlocking device.
Figure 11B:
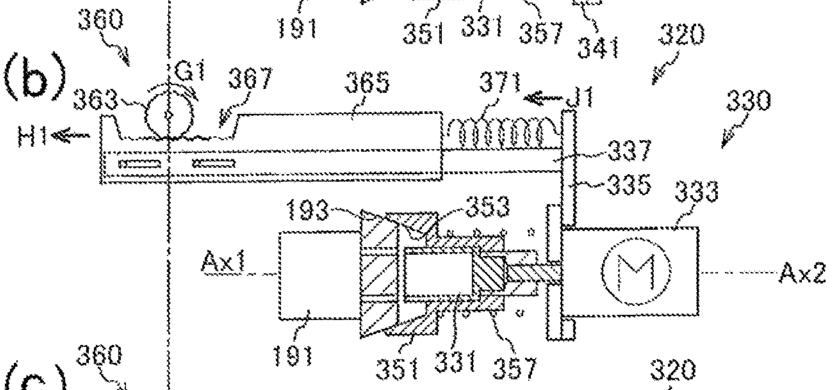
Figure 11C:
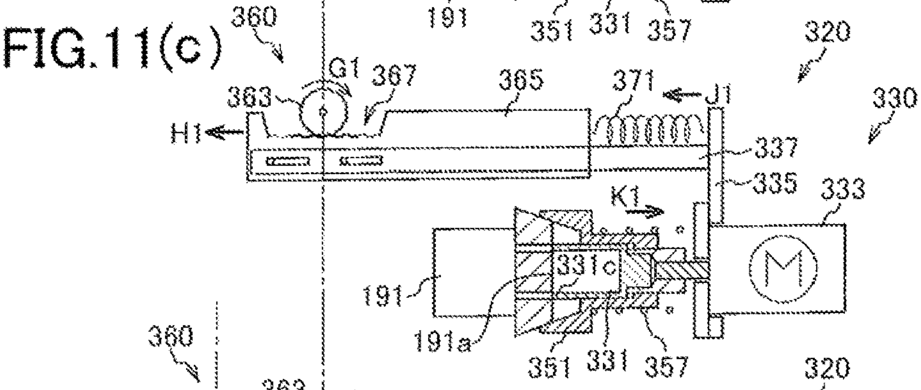
Figure 11D:
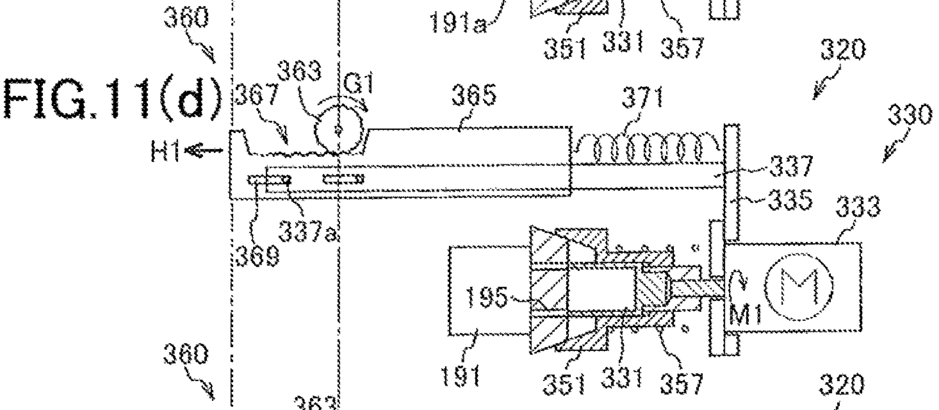
Figure 11E:
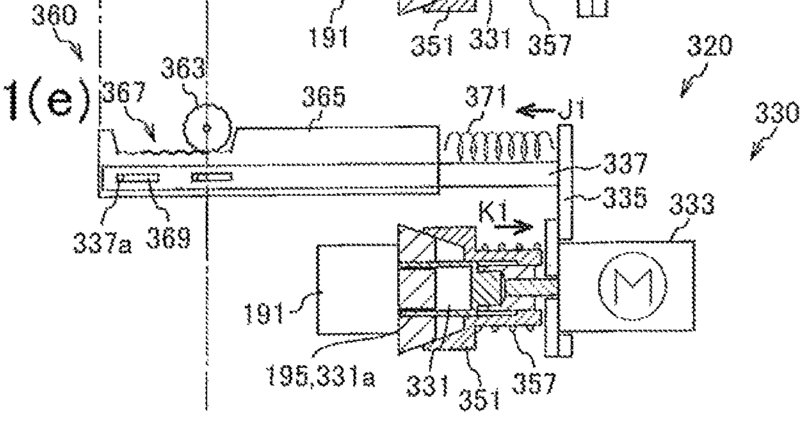

FIG. 10 is a perspective view illustrating the locking/unlocking device.

The handling device 300 includes the locking/unlocking device 320 that automatically locks and unlocks the lock 191 provided on the banknote storage 100 (FIG. 9(*a*)). The locking/unlocking device 320 is substantially arranged at an intermediate part in the upward/downward direction and at one end in the width direction in the handling device 300.

As illustrated in FIG. 10, the locking/unlocking device 320 includes a key unit 330 configured to include the key 331 that locks and unlocks the lock 191 and a key rotation motor (a key rotation driving unit) 333 that applies a rotation driving force for locking/unlocking the lock to the key 331, and a key movement mechanism 360 that moves the key unit 330 back and forth with respect to the lock 191 along the X-axis direction in the drawings between a spaced position (FIG. 11(*a*)) where the key 331 is spaced from the lock 191 and a lock/unlock position (FIG. 11(*e*)) where the key 331 can lock and unlock the lock 191.

A reference sign Ax2 in FIG. 10 indicates an axis (the rotation center axis) of an output shaft 333*b* of the key 331 and the key rotation motor 333.

<<Key Unit>>

The key unit 330 includes a base member 335 that supports the key rotation motor 333, and an arm member 337 that is installed to be protruded from the base member 335 in the advancing/retracting direction of the key 331.

The base member 335 has a substantially flat plate shape, and a motor insertion hole 335*a* and a plurality of shaft holes 335*b* arranged around the motor insertion hole 335*a* at predetermined intervals are formed in the plane to pass therethrough. A body part 333*a* of the key rotation motor 333 is loosely fitted in the motor insertion hole 335*a*.

The key unit 330 further includes a bracket 341 fixed to the other end face (on the side of the output shaft 333*b*) in the axial direction of the body part 333*a* of the key rotation motor 333, a plurality of shoulder bolts 345 (only one thereof is illustrated in FIG. 10) each having an end threaded part that is screwed to the bracket 341 with a nut 343 and having a shank 345*a* on the head side, which is loosely fitted into the associated shaft hole 335*b* of the base member 335, and a helical compression spring (an elastic biasing member) 347 through which the shank 345*a* of each of the shoulder bolts 345 protruded toward one face (on the side of the body part 333*a* of the key rotation motor 333) of the base member 335 is inserted and that elastically biases the bracket 341 to the other face of the base member 335 via the shoulder bolts 345.

The key rotation motor 333 is swingably supported by the base member 335, and the position of the axis Ax2 of the output shaft 333*b* and the inclination angle with respect to the base member 335 (the position in the YZ plane and the inclination angle with respect to the YZ plane in FIG. 10) change in a predetermined range.

The key 331 described in the present example is a so-called tubular key and has a bottomed cylindrical key body 331*a* with the distal end face open. The back end of the key 331 is fixed to the output shaft 333*b* of the key rotation motor 333. The key 331 rotates in forward and reverse directions coaxially and integrally with the output shaft 333*b* of the key rotation motor 333.

A protrusion 331*b* protruded in the outer diameter direction and extending in the axial direction is formed on the outer circumferential surface of the distal end of the key body 331*a* in the axial direction. The key body 331*a* is inserted into the keyhole 195 when the protrusion 331*b* of the key body 331*a* and the guide groove 195*a* formed on the keyhole 195 are aligned in the position with each other according to the rotation angle of the key 331.

<<<Centering Member>>>

The key unit 330 includes a centering member 351 that is configured to be capable of moving back and forth with respect to the base member 335 and the key 331 and that aligns the rotation center axes Ax1 and Ax2 of the key 331 and the lock 191 with each other, and a helical compression spring (an elastic biasing member) 357 that elastically biases the centering member 351 in a direction away from the base member 335.

The centering member 351 has a substantially hollow tubular shape (a substantially cylindrical shape in the present example) and includes an engaging hole 353 that receives the engaged portion 193 of the lock 191 into the hollow inner part from a distal end opening 351*a* to engage therewith, and a key holding hole 355 that is arranged axially behind the engaging hole 353 (on the back side, on the side of the key rotation motor 333) and that holds the back end of the key 331, at a distal end (on the side of the lock 191) in the axial direction.

The engaging hole 353 is a void in a circular truncated cone shape with the inner diameter gradually decreasing from the distal end opening 351*a* toward the back side. The key holding hole 355 holds the key 331 to enable the key 331 to relatively move back and forth along the rotation center axis Ax2 and to enable the key 331 to relatively rotate thereon. The centering member 351 has an axis substantially common to the axis Ax2 of the key 331, and the position and the inclination angle of the axis of the centering member 351 with respect to the base member 335 change with the key rotation motor 333 in a predetermined range. When the engaging hole 353 engages with the engaged portion 193 at the distal end, the rotation center axes Ax1 and Ax2 of the lock 191 and the key 331 are aligned with each other.

The centering member 351 moves back and forth between a spaced position (a first position) where the centering member 351 is spaced from the base member 335 to sink the key 331 therein and an approaching position (a second position) where the centering member 351 approaches the base member 335 to cause the key 331 to be protruded from the distal end opening 351*a* (FIG. 11). That is, the key 331 moves back and forth relative to the centering member 351 between a sunk position where the key 331 is sunk inside the centering member 351 and a protruded position where the key 331 is protruded from the distal end opening 351*a* of the centering member 351.

The helical compression spring 347 enables the back end of the centering member 351 to be inserted in the hollow part. Since the helical compression spring 347 elastically biases the centering member 351 to the spaced position, the key 331 is normally sunk in the inner part of the centering member 351. The helical compression spring as a unit for elastically biasing is an example, and the centering member 351 may be elastically biased by other elastic biasing units.

<<Key Movement Mechanism>>

The key movement mechanism 360 illustrated in FIG. 10 moves the key unit 330 back and forth between a spaced position where the key 331 is spaced from the lock 191 and a locking/unlocking position where the key 331 can lock or unlock the lock 191, when the lock 191 is opposed to the key 331, that is, the banknote storage 100 is at the banknote storage stop position illustrated in FIG. 9(*b*).

The key movement mechanism 360 includes a key advancing/retracting motor 361 being a driving source that advances and retracts the key unit 330, a pinion gear 363 that is fixed to the output shaft of the key advancing/retracting motor 361 and that rotates coaxially and integrally with the output shaft, and a rack plate (a driving force applying member) 365 including a rack gear 367 that meshes with the pinion gear 363. The rack plate 365 moves back and forth in the X-axis direction in the drawing between an initial position for moving the key unit 330 to the spaced position, and an advanced position for moving the key unit 330 to the locking/unlocking position. The key unit 330 moves back and forth in the X-axis direction in the drawing, thereby applying a driving force for moving the key unit 330 back and forth in the X-axis direction in the drawing to the key unit 330.

As illustrated in FIGS. 10 and 11, the key movement mechanism 360 includes a helical extension spring (an elastic biasing member) 371 interposed between the base member 335 (or the arm member 337) of the key unit 330 and the rack plate 365. The helical extension spring 371 has one end in the axial direction attached to an appropriate place of the rack plate 365 and the other part attached to an appropriate place of the base member 335. The driving force for moving the key unit 330 back and forth is transmitted from the rack plate 365 to the key unit 330 via the helical extension spring 371. The helical extension spring 371 normally moves the key unit 330 back and forth integrally with the rack plate 365 while moving the key unit 330 back and forth relative to the rack plate 365 when the key unit 330 is subjected to an external force opposite to the back/forth movement direction of the rack plate 365.

Long holes 369 are formed through the rack plate 365 along the back/forth movement direction of the rack plate 365 in a face where the rack gear 367 is not formed. Slide pins 337*a* provided on the arm member 337 in a protruded manner are loosely fitted in the long holes 369, respectively. The long holes 369 restrict the relative movement direction of the arm member 337 (the key unit 330) with respect to the rack plate 365 to the extending direction of the long holes 369 via the slide pins 337*a*.

<<Positional Relation>>

In the present example, the key movement mechanism 360 and the key 331 are arranged on the side of one face of the base member 335, and the key movement mechanism 360 (the rack plate 365) and the key 331 are arranged in parallel to each other. When the banknote storage 100 is set in the receiving portion 301 of the handling device 300, the key unit 330 is opposed to one face of the banknote storage 100 in the longer direction, and the key movement mechanism 360 is positioned on the side of the other end of the banknote storage 100 in the shorter direction. Therefore, the total length of the handling device 300 in a direction along the longer direction of the banknote storage 100 can be reduced, and the handling device 300 can be downscaled.

The key movement mechanism 360 may be attached to the side of the other face of the base member 335.

<<Operation>>

FIGS. 11(*a*) to 11(*e*) are schematic diagrams for explaining a sequence of operations related to locking and unlocking of the lock by the locking/unlocking device.

The positions of the members in the drawings are as follows.

The rack plate 365: (a) the initial position, (d) and (e) the advanced position.

The key unit 330: (a) the retracted position, (e) the locking/unlocking position.

The centering member 351: (a) the spaced position, (e) the approaching position.

The key 331: (a) the sunk position, (e) the protruded position.

FIGS. 11(*a*) to 11(*c*) illustrate states in which the rack plate 365 and the key unit 330 integrally move back and forth, and FIGS. 11(*d*) and 11(*e*) illustrate states in which the rack plate 365 and the key unit 330 relatively displace.

FIG. 11(*a*) illustrates a state where the banknote storage 100 is set in the receiving portion 301 of the handling device 300 and the lock 191 is opposed to the key 331. The rack plate 365 of the key movement mechanism 360 is at the initial position, and the key unit 330 is at the retracted position away from the lock 191. The key 331 is at the sunk position where the key 331 is sunk in the centering member 351.

As illustrated in FIG. 11(*b*), when the key advancing/retracting motor 361 is driven, the pinion gear 363 rotates in the direction of an arrow G1 in the drawing to advance the rack plate 365 in the direction of an arrow H1 in the drawing. Along with the movement of the rack plate 365, the key unit 330 moves in the same direction (a direction J1) as the rack plate 365. Since an external force that prevents the advance is not applied to the key unit 330 at that time, the key unit 330 advances integrally with the rack plate 365 via the helical compression spring 347.

When the key advancing/retracting motor 361 is driven and the key unit 330 advances toward the lock 191, the engaged portion 193 of the lock 191 engages with the engaging hole 353 of the centering member 351 as illustrated in FIG. 11(*b*). Since the engaged portion 193 and the engaging hole 353 have the frustum shapes, the centering member 351 aligns the rotation center axes Ax1 and Ax2 of the lock 191 and the key 331 with each other during the process in which the engaged portion 193 engages with the engaging hole 353. That is, when the position and the inclination angle of the rotation center axis Ax2 of the key 331 do not match those of the rotation center axis Ax1 of the lock 191, the attitude of the key rotation motor 333 with respect to the base member 335 changes during the process in which the engaging hole 353 receives the engaged portion 193, so that the rotation center axes Ax1 and Ax2 are aligned with each other. At the time when the engaged portion 193 engages with the engaging hole 353, the key 331 is in a state spaced from a front face 191*a* of the lock and is sunk in the centering member 351.

As illustrated in FIG. 11(*c*), when the rack plate 365 further advances, the centering member 351 retracts in the direction of an arrow K1 in the drawing against the elastic biasing force of the helical compression spring 357, and a distal end edge 331*c* of the key 331 advances to the front face 191*a* of the lock 191.

As illustrated in FIG. 11(*d*), when the rotation angle of the key 331 does not match the shape of the keyhole 195, that is, when the positions of the protrusion 331*b* illustrated in FIG. 10 and the guide groove 195*a* are not aligned with each other, the key 331 keeps a state where the distal end edge abuts on the front face 191*a* of the lock 191, so that the key unit 330 stops at that position. Meanwhile, the key advancing/retracting motor 361 continues driving in the direction of the arrow G1 in the drawing and the rack plate 365 moves to the advanced position in the direction of the arrow H1 in the drawing. Therefore, the relative positional relation between the rack plate 365 and the arm member 337 (or the base member 335) changes.

When the rack plate 365 reaches the advanced position, the key advancing/retracting motor 361 stops driving. The key rotation motor 333 is driven to rotate the key 331 in the unlocking direction (the direction of an arrow M1 in the drawing).

As illustrated in FIG. 11(*e*), when the rotation angle of the key 331 matches the shape of the keyhole 195, the key unit 330 advances in the direction of the arrow J1 in the drawing to the locking/unlocking position due to the elastic biasing force of the helical extension spring 371, and the key 331 enters the keyhole 195. The centering member 351 moves in the direction of the arrow K1 in the drawing to approach the base member 335, and the key 331 is protruded from the centering member 351. At that time, the key 331 is brought to a state pressed toward the lock 191 in the keyhole 195 by the elastic biasing force of the helical extension spring 371. When the lock 191 is unlocked, the key rotation motor 333 stops.

When the lock 191 is to be locked, a substantially inverse procedure is performed. That is, the key rotation motor 333 is driven to rotate the key 331 in the unlocking direction. When the lock is locked, the key rotation motor 333 stops. When the key rotation motor 333 stops, the key advancing/retracting motor 361 is driven to move the key unit 330 to the retracted position. When the rack plate 365 moves to the initial position, the key advancing/retracting motor 361 stops.

<Banknote Bundle Movement Mechanism>

The banknote bundle movement mechanism 400 illustrated in FIG. 9 includes a lid unit opening/closing mechanism 410 (FIG. 12) that moves back and forth between a spaced position spaced from the lid body 171 of the banknote storage 100 located in the receiving portion 301 and an approaching position where the lid body 171 is latched, and that moves the lid unit 170 to the open position by moving to the spaced position in the state where the lid body 170 is latched, a loading table 450 (FIG. 13) that is configured to receive and load banknote bundles having moved outward from the lateral opening 113 by the banknote bundle moving member 177 (see FIG. 5) in accordance with the movement of the lid unit 170 to the open position while at a lifted standby position and to be capable of being lowered from the standby position to a lowered position in the state where the banknote bundles are loaded thereon, a loading table lifting/lowering mechanism 500 (FIG. 13) that lifts and lowers the loading table 450 between the lifted standby position and the lowered position, a loading table movement mechanism 560 (FIG. that horizontally moves the loading table 450 at the lowered position to a predetermined banknote bundle discharge position, a loading table retraction mechanism 590 (FIG. 15) that retracts the loading table 450 having moved to the banknote bundle discharge position, and a restricting member 470 (FIG. 15) that restricts banknote bundles to the banknote bundle discharge position when the loading table 450 is retracted.

<<Lid Unit Opening/Closing Mechanism>>

Figure 12:
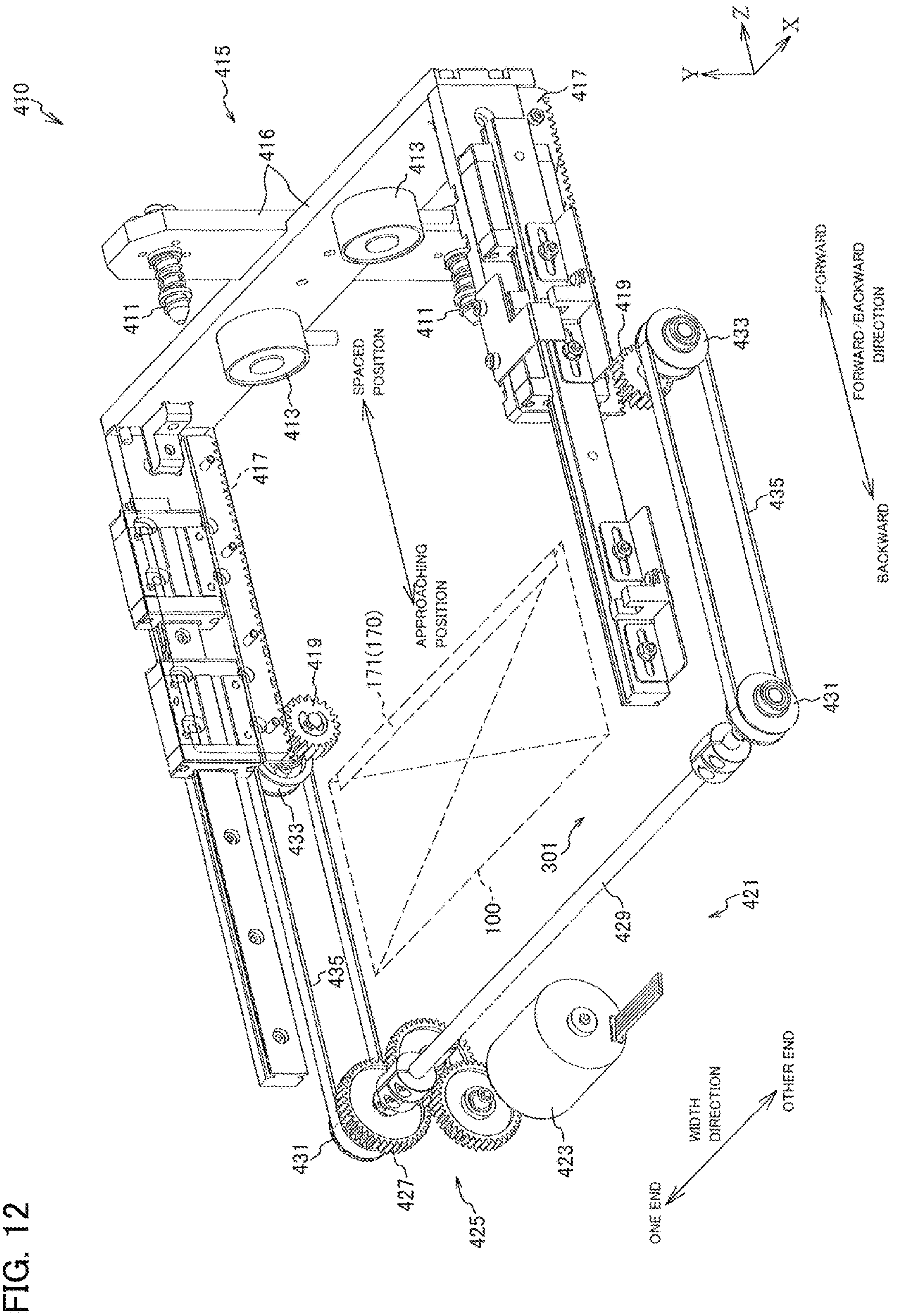
FIG. 12 is a perspective view illustrating a lid unit opening/closing mechanism.

FIG. 12 is a perspective view illustrating the lid unit opening/closing mechanism. The lid unit opening/closing mechanism 410 is arranged on an upper part of the handling device 300.

The lid unit opening/closing mechanism 410 is arranged to be opposed to the lid body 171 located on one side face of the banknote storage 100 set at the banknote storage stop position in the receiving portion 301 and includes latching protrusions 411 and 411 which are inserted into the latched holes 173 and 173 of the lid unit 170 (FIG. 9(*a*)) and electromagnets (a sticking unit) 413 and 413 which stick to the stuck portions 175 and 175 to hold these portions when moving to the approaching position, a support member (a moving member) 415 that has rack gears 417 and 417 having gear teeth extending in the forward/backward direction on both ends in the width direction and that supports the latching protrusions 411 and 411 and the electromagnets 413 and 413 at an intermediate part in the width direction, pinion gears 419 and 419 that mesh with the gear teeth of the rack gears 417 and 417 to move the support member 415 back and forth between the approaching position and the spaced position, and a driving unit 421 that rotationally drives the pinion gears 419 and 419.

The latching protrusions 411 and 411 are inserted into the latched holes 173 and 173, thereby latching the lid unit 170 and keeping the attitude fixed when the lid unit 170 is moved in the forward/backward direction.

The electromagnets 413 and 413 temporarily generate a magnetic force by being energized by a power source (not illustrated). The electromagnets 413 and 413 having moved to the approaching position magnetically attract the stuck portions 175 and 175 with the magnetic force generated by the energization. The magnetic force generated by the electromagnets 413 and 413 is set to have a magnitude enabling the lid unit 170 to move to the open position to take the banknote bundles accommodated in the banknote storage 100 outside while the stuck portions 175 and 175 are kept magnetically attracted, when the electromagnets 413 and 413 move to the spaced position.

The support member 415 includes a cross-shaped support frame 416 that supports the latching protrusions 411 and 411 and the electromagnets 413 and 413. The rack gears 417 and 417 are protruded backward from the both ends of the support frame 416 in the width direction. The rack gears 417 and 417 mesh with the pinion gears 419 and 419 arranged on ends of the handling device 300 in the width direction, respectively.

The pinion gears 419 and 419 are pivotally supported at appropriate places of the frame body 305 of the handling device 300, respectively, to be rotatable in the forward and reverse directions. The pinion gears 419 and 419 receive the driving force from the driving unit 421 to simultaneously rotate in the forward or reverse direction, and move the support frame 416 in the forward/backward direction according to the rotation direction.

The driving unit 421 includes a gear group 425 configured to include a motor 423, and an output gear 427 that outputs the driving force transmitted from the motor 423, a driving transmission shaft 429 that extends in the width direction of the handling device 300 and has an appropriate place in the axial direction fixed to the output gear 427 to be integrally rotatable, driving pulleys 431 and 431 fixed to both ends of the driving transmission shaft 429 in the axial direction to be rotatable integrally with the driving transmission shaft 429, driven pulleys 433 and 433 attached to the pinion gears 419 and 419 to be rotatable integrally therewith, respectively, and belt members 435 and 435 that are wound on the driving pulleys 431 and 431 and the driven pulleys 433 and 433 that are arranged on ends in the width direction, respectively, to transmit the driving force from the driving pulleys 431 and 431 to the driven pulleys 433 and 433. The pinion gears 419 and 419 respectively arranged on the ends in the width direction are simultaneously driven with the driving force transmitted from the driving unit 421. The illustrated configuration of the driving unit 421 is an example and the driving unit 421 is not limited to this configuration.

<<Loading Table Lifting/Lowering Mechanism>>

Figure 13B:
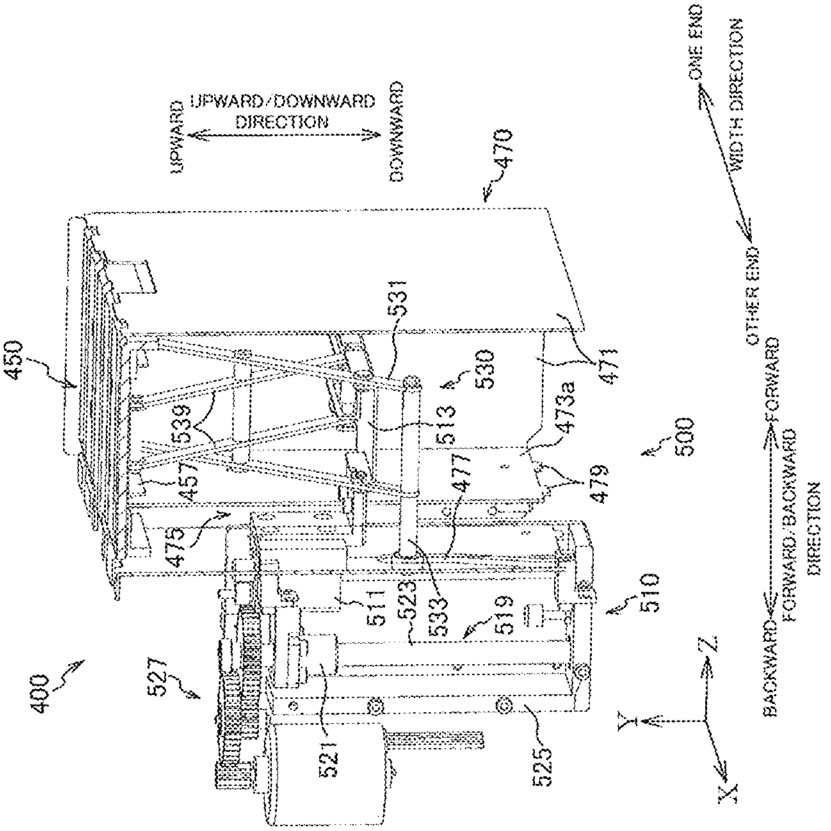
FIG. 13 are sectional perspective views illustrating a loading table and a loading table lifting/lowering mechanism, where (a) is a view illustrating a state where the loading table is at a lowered position and (b) is a view illustrating a state where the loading table is at a lifted position.
Figure 13A:
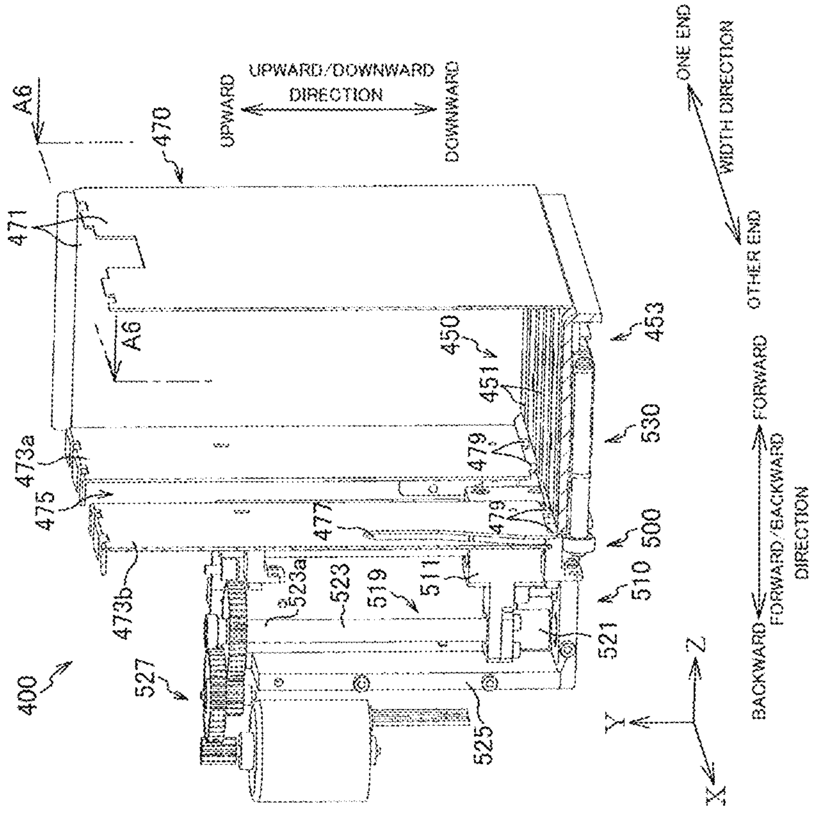
Figure 14:
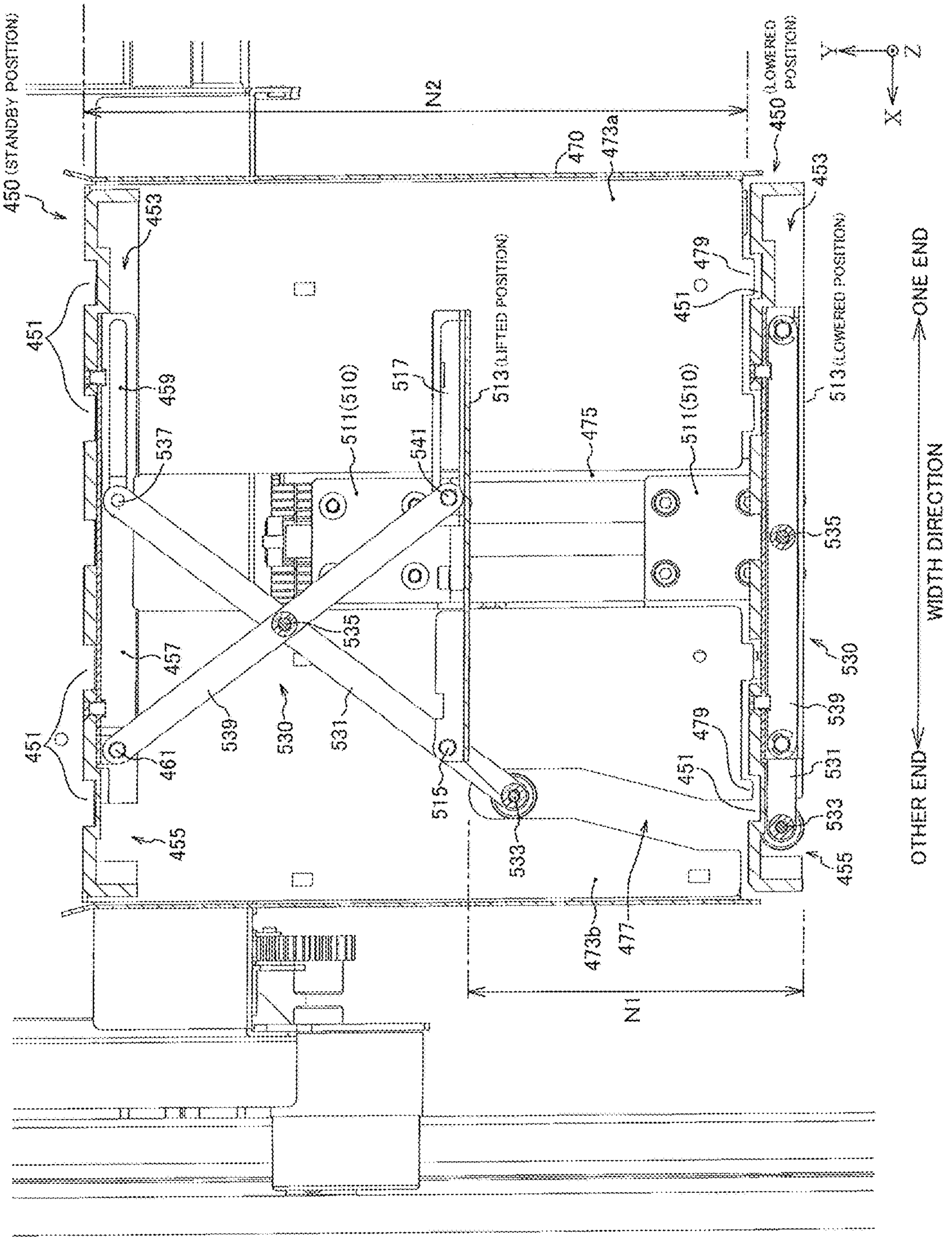
FIG. 14 is a front view for explaining an operation of the loading table lifting/lowering mechanism.

FIG. 13 are sectional perspective views illustrating the loading table and the loading table lifting/lowering mechanism, where (a) is a view illustrating a state where the loading table is at the lowered position and (b) is a view illustrating a state where the loading table is at the lifted position. FIG. 14 is a front view for explaining an operation of the loading table lifting/lowering mechanism. FIG. 13 correspond to a cross section along A5-A5 in FIG. 9(*a*) and FIG. 14 is a view corresponding to a cross section along A6-A6 in FIG. 13(*a*). FIG. 14 illustrates the loading table

450 and the loading table lifting/lowering mechanism 500 in both a state where the loading table 450 is lowered to the lowered position and a state where the loading table 450 is lifted to the standby position.

The banknote bundle movement mechanism 400 includes the loading table 450, and the loading table lifting/lowering mechanism 500 that lifts and lowers the loading table 450 between the lifted standby position and the lowered position. The loading table lifting/lowering mechanism 500 lifts and lowers the loading table 450 immediately below the lid unit 170 having moved to the open position (see FIGS. 17 and 18). The loading table lifting/lowering mechanism 500 includes a first lifting/lowering mechanism 510 that lifts and lowers a support body 513 supporting the loading table 450, and a pantograph mechanism 530 (a second lifting/lowering mechanism) that expands and contracts according to the height position of the support body 513 to lift and lower the loading table 450 on the support body 513.

<<<Loading Table>>>

A plurality of grooves 451, 451, extending in the forward/backward direction are formed on the upper face of the loading table 450 to be spaced from each other in the width direction. The loading table 450 has a pantograph housing portion 453 that houses the contracted pantograph mechanism 530 in a lower part. An engaging concave portion 455 with which a guided pin 533 of the contracted pantograph mechanism 530 is to be engaged is provided on a back side face (see FIG. 14).

<<<Restricting Member>>>

The loading table 450 is lifted and lowered inside the restricting member 470.

The restricting member 470 has a substantially half rectangular column shape open on the upper face and the lower face. The restricting member 470 surrounds at least a part of the outer perimeter of banknote bundles received by the loading table 450 from the banknote storage 100 and restricts the side face position of the banknote bundles. The length of the restricting member 470 in the upward/downward direction is set to a length that enables a maximum quantity of banknote bundles accommodated in the banknote storage 100 to be accommodated in a stacked state.

The restricting member 470 includes a guide plate 471 in an angular U-shape in top view that restricts the positions of the front face (one side face extending in the long edge direction) of banknote bundles and both side faces in the width direction (both side faces extending in the short edge direction), and restricting plates 473 (473*a* and 473*b* in FIG. 14) each extending from an end edge of the guide plate 471 toward the other end edge to restrict the position of the rear face of banknote bundles (the other side face extending in the long edge direction). A slit 475 (FIG. 13) extending entirely in the upward/downward direction is formed between the restricting plates 473*a* and 473*a* provided on the rear face.

The restricting plate 473*b* arranged on the other side in the width direction has a notch 477 (or a long groove) formed thereon to extend upward from the lower end edge. The notch 477 has a shape in which the lower end in the longer direction extends in the upward/downward direction, the intermediate part extends obliquely from the other end in the width direction (an end of the restricting member 470 in the width direction) to one end (an intermediate part of the restricting member 470), and the upper end extends in the upward/downward direction.

A plurality of engaging protrusions 479, 479, . . . that can engage with the grooves 451, 451, . . . formed on the upper face of the loading table 450 to move in the forward/backward direction in the grooves 451, 451, . . . respectively, are formed on the lower end edge of each of the restricting plates 473*a* and 473*b*. The engaging protrusions 479, 479, . . . respectively run in the grooves 451, 451, . . . when the loading table 450 is moved backward relative to the restricting member 470 by the loading table retraction mechanism 590 (FIG. 15) described later.

<<<First Lifting/Lowering Mechanism>>>

The first lifting/lowering mechanism 510 is primarily arranged behind the loading table 450 and immediately below the receiving portion 301.

The first lifting/lowering mechanism 510 schematically includes a lifting/lowering member 511 including the support body 513 at the front, and a ball screw 519 configured to include a nut 521 attached to the back of the lifting/lowering member 511 and a screw shank 523 screwed with the nut 521 to lift and lower the nut 521 (FIGS. 13 and 14).

The lifting/lowering member 511 supports the support body 513 from outside the restricting member 470 through the slit 475 formed on the restricting member 470. The support body 513 is lifted and lowered in the restricting member 470 along the slit 475. The support body 513 supports the pantograph mechanism 530.

The screw shank 523 of the ball screw 519 is arranged in such a manner that the axial direction extends in the upward/downward direction. The screw shank 523 is rotated in the forward direction or the reverse direction on the axis by a driving unit 527 coupled to one end 523*a* (an upper end in the present example) in the axial direction, thereby lifting and lowering the nut 521 screwed on the screw shank 523.

Figure 15:
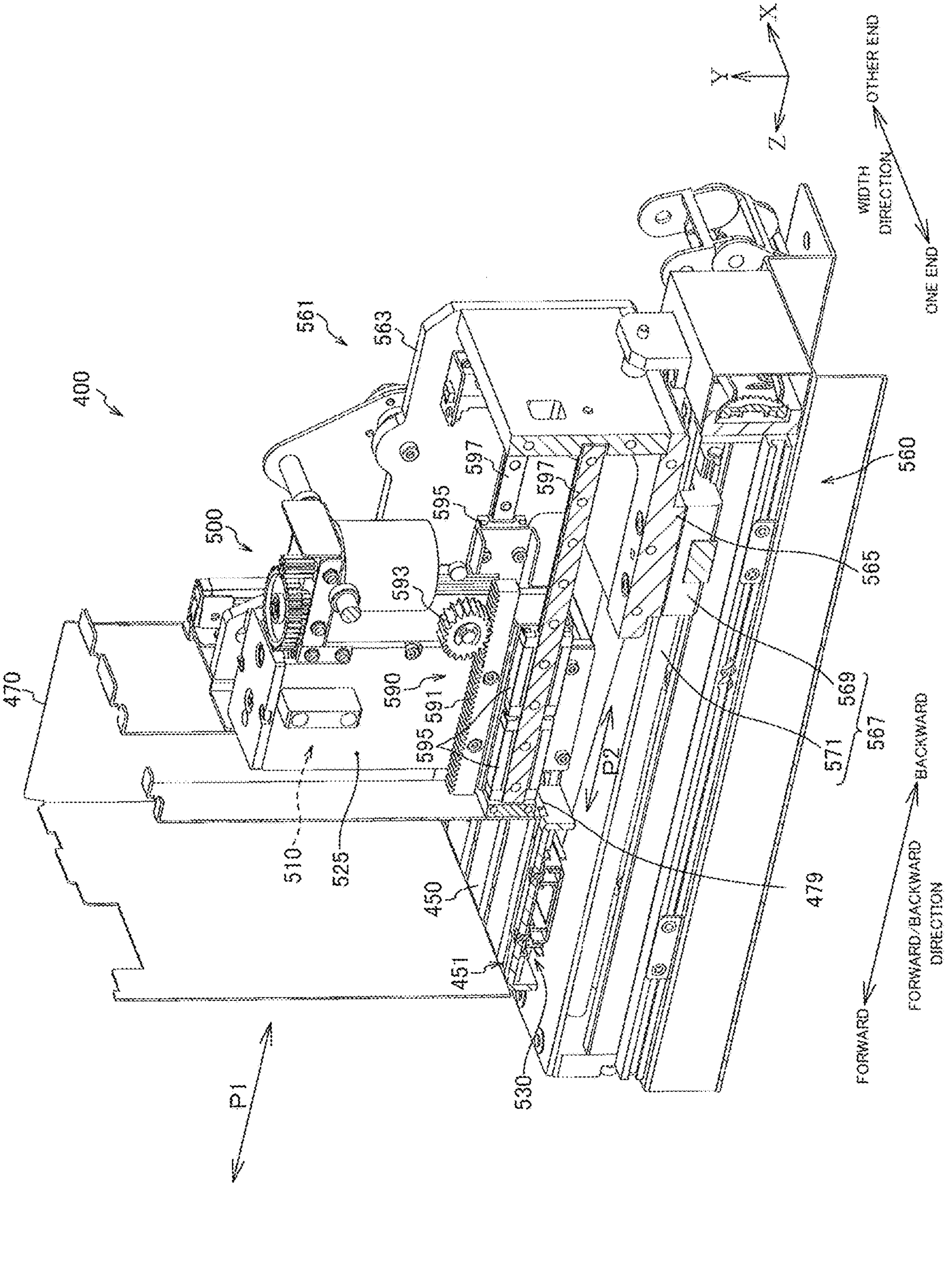
FIG. 15 is a sectional perspective view illustrating configurations of a loading table movement mechanism and a loading table retraction mechanism.

The ball screw 519 is accommodated in a housing 525 that has an opening allowing lifting and lowering of the lifting/lowering member 511 on the front face (FIGS. 14 and 15). The both ends (the upper and lower ends) of the ball screw 519 in the axial direction are pivotally supported by the housing 525.

The support body 513 is lifted and lowered by an operation of the ball screw 519 in a range (a range N1 in the drawing) of an intermediate part of the restricting member 470 in the upward/downward direction from immediately below the restricting member 470 (FIG. 14).

<<<Pantograph Mechanism>>>

The pantograph mechanism 530 schematically includes a first link piece 531 having the guided pin 533, which moves back and forth in the notch 477 (or the long groove) formed on one side face of the restricting member 470, at one end in the longer direction, and a second link piece 539 where an intermediate part in the longer direction is pivotably supported by a pivotally support portion 535 provided on an intermediate part of the first link piece 531 in the longer direction.

An appropriate place near one end in the longer direction of the first link piece 531 positioned between the guided pin 533 and the pivotally support portion 535 is pivotably supported by a pivotally support portion 515 formed on the side face of the support body 513. A pin 537 arranged on the other end of the first link piece 531 is loosely fitted in a long hole 459 (or a long groove) linearly extending in the width direction of a support piece 457 formed in the pantograph housing portion 453 of the loading table 450 and freely moves back and forth in the long hole 459.

One end of the second link piece 539 in the longer direction is pivotably supported by a pivotally support portion 461 provided on the support piece 457 of the loading tale 450. A pin 541 provided on the other end of the second link piece 539 in the longer direction is loosely fit in a long hole 517 (or a long groove) formed on the side face of the support body 513 and linearly extending in the width direction, and freely moves back and forth in the long hole 517.

The notch 477 of the restricting member 470 restricts (guides) the position in the width direction of the guided pin 533 according to the height position of the support body 513 to expand or contract a pantograph including the first link piece 531 and the second link piece 539 on the support body 513. That is, the notch 477 is a grooved cam. The pantograph mechanism 530 separates the loading table 450 from the support body 513 when the pantograph is expanded in an expanded attitude and moves the loading table 450 close to the support body 513 when the pantograph is contracted in a contracted attitude.

With the operation of the pantograph mechanism 530, the loading table 450 is lifted and lowered in a range (a range N2 in the drawing) from immediately below (or the lower end of) the restricting member 470 to the upper end of the restricting member 470 (FIG. 14).

<<<Operation>>>

As illustrated in FIG. 14 (FIG. 13(*a*)), when the lifting/lowering member 511 (the support body 513) is at the lowered position, the pantograph mechanism 530 takes the contracted attitude on the support body 513 and the loading table 450 is positioned at the lowered position. At that time, the guided pin 533 is positioned outside the notch 477 (at a position lower than the lower end edge of the restricting plate 473*b*) and is not engaged. Furthermore, the support body 513 and the pantograph mechanism 530 are housed in the pantograph housing portion 453 of the loading table 450.

When the first lifting/lowering mechanism 510 is driven and the support body 513 is lifted, the loading table 450 and the support body 513 are lifted in the restricting member 470. Furthermore, the guided pin 533 enters (engages with) the notch 477 from the lower end edge. The guided pin 533 is guided by the notch 477 in the position in the width direction to cause the first link piece 531 and the second link piece 539 to gradually stand according to the height position of the support body 513, thereby separating (lifting) the loading table 450 from the support body 513.

As illustrated in FIG. 14 (FIG. 13(*b*)), when the lifting/lowering member 511 (the support body 513) is at the lifted position, the pantograph mechanism 530 takes the expanded attitude in which it stands on the support body 513 and separates the loading table 450 from the support body 513. The loading table 450 is at the lifted standby position.

In this way, since the loading table lifting/lowering mechanism 500 includes the first lifting/lowering mechanism 510 that lifts and lowers the support body 513 in the range N1 in FIG. 14, and the pantograph mechanism 530 that expands and contracts on the support body 513 according to the height position of the support body 513, the loading table lifting/lowering mechanism 500 can lift and lower the loading table 450 in the range N2 in FIG. 14 beyond the lifting amount of the support body 513.

<<Movement/Retraction of Loading Table>>

FIG. 15 is a sectional perspective view illustrating the configurations of the loading table movement mechanism and the loading table retraction mechanism. FIG. 15 is a view corresponding to a cross section along A7-A7 in FIG. 9(*a*).

Figure 18:
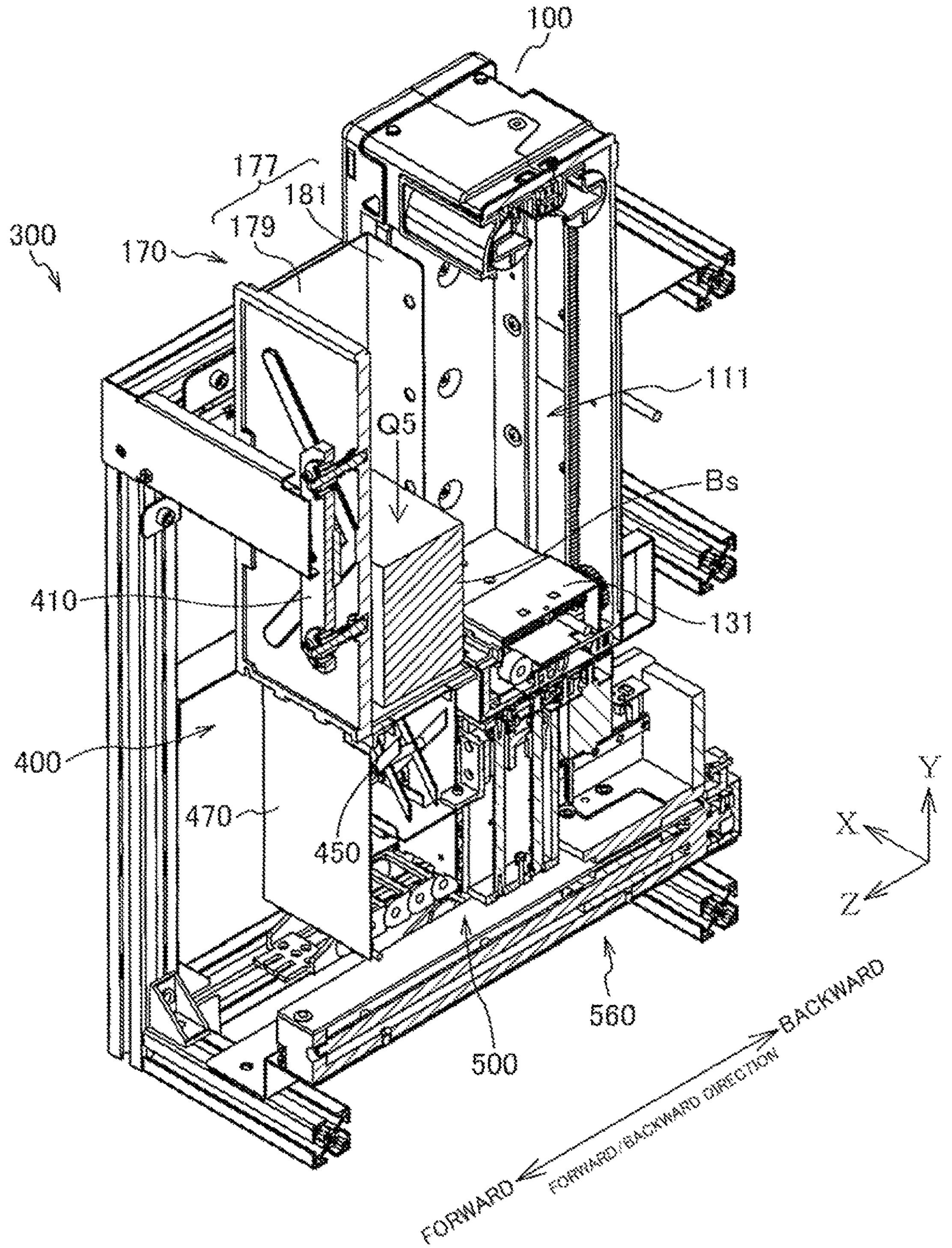
FIG. 18 is a sectional perspective view for explaining a sequence of operations of the banknote storage handling device.
Figure 19:
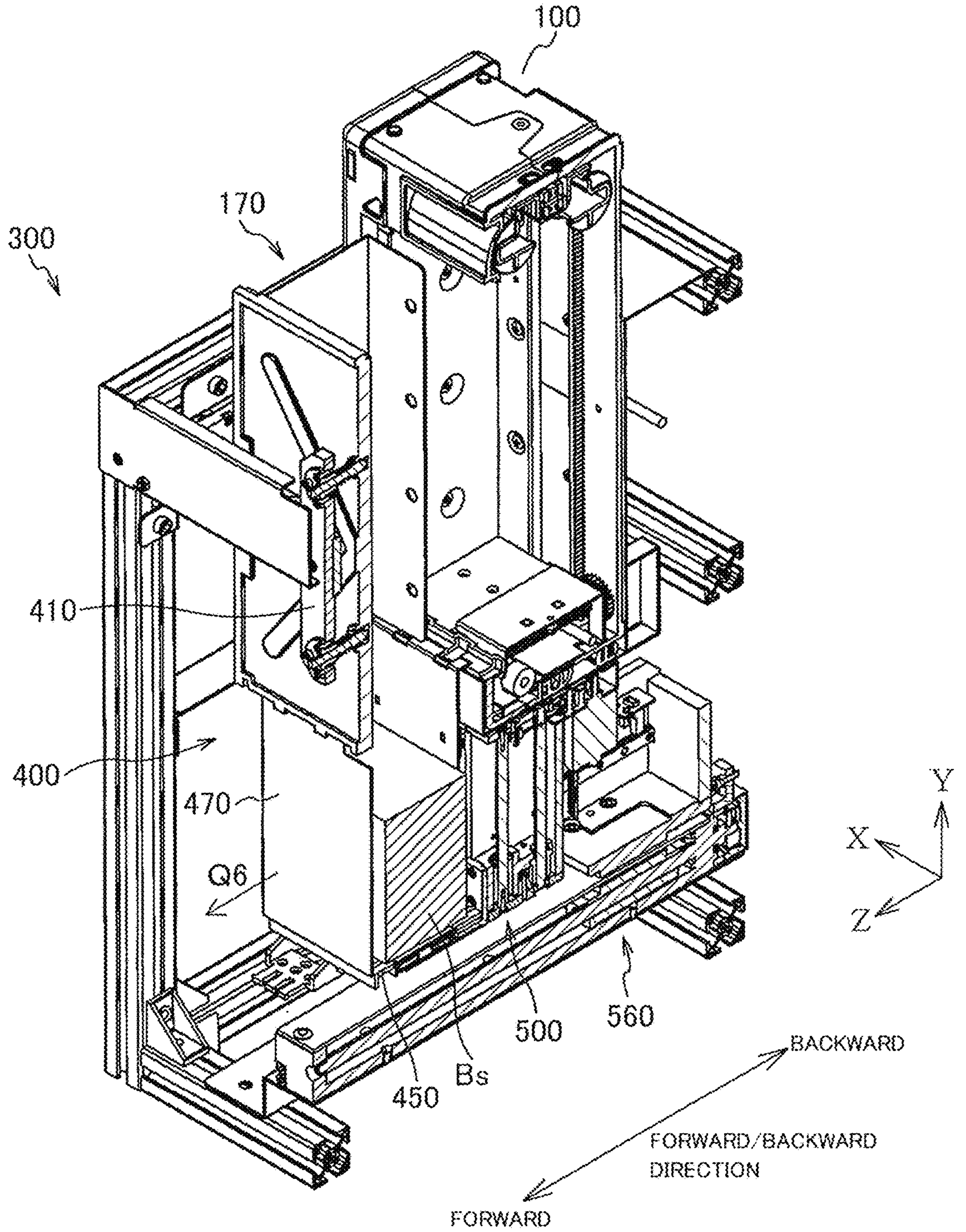
FIG. 19 is a sectional perspective view for explaining a sequence of operations of the banknote storage handling device.
Figure 20:
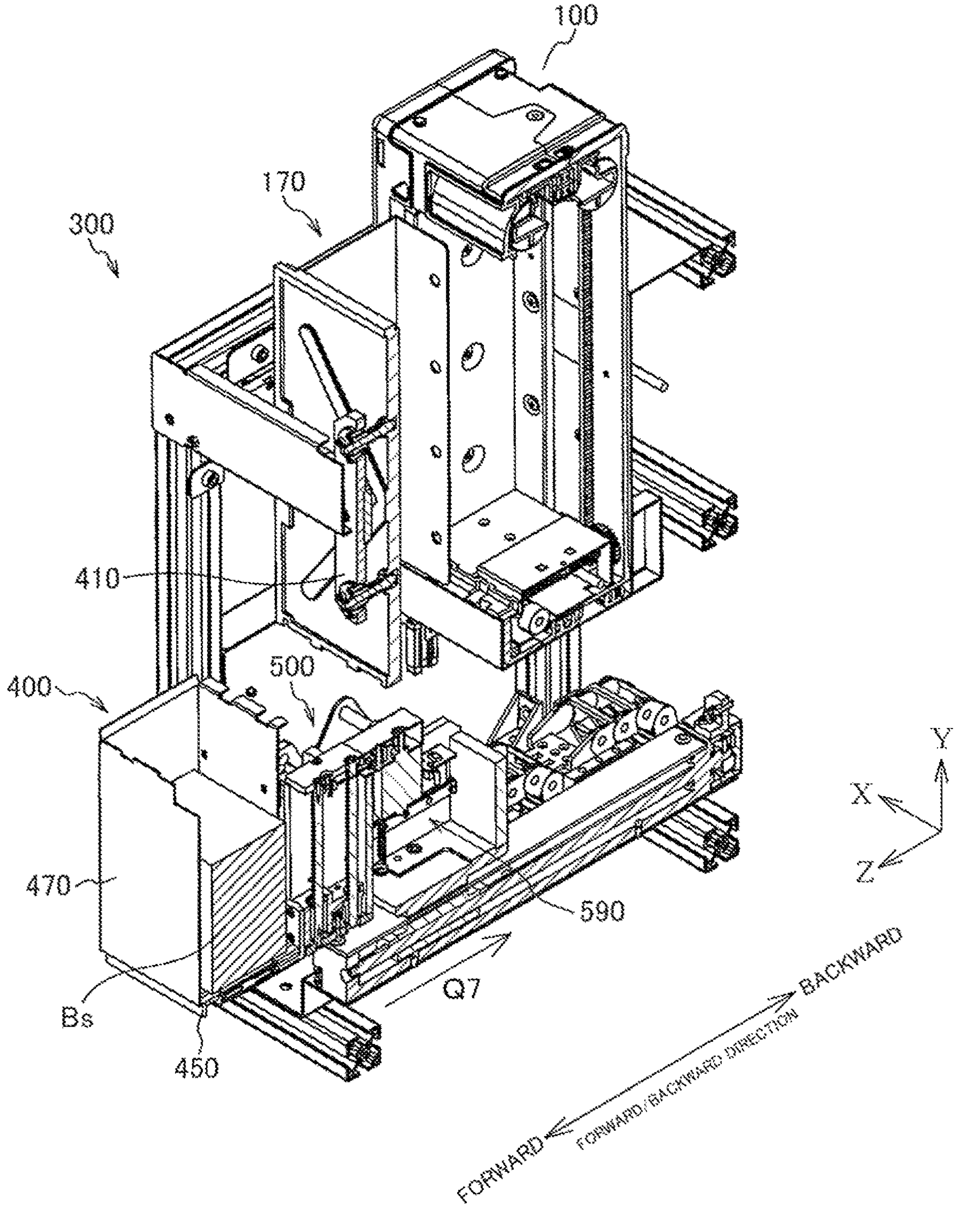
FIG. 20 is a sectional perspective view for explaining a sequence of operations of the banknote storage handling device.

The banknote bundle movement mechanism 400 includes the loading table movement mechanism 560 that integrally moves the restricting member 470 and the loading table lifting/lowering mechanism 500 that supports the loading table 450 back and forth between a retreat banknote bundle receiving position illustrated in FIGS. 16 to 19 and an advanced banknote bundle discharge position illustrated in FIG. 20 (in a range P1 in the drawing).

The banknote bundle receiving position is a position where banknote bundles taken out from the banknote storage 100 are accommodated in the restricting member 470 while kept in a stacked state. The banknote bundle discharge position is a position where banknotes of banknote bundles temporarily accommodated in the restricting member 470 are discharged (dropped) into a place such as the banknote inlet 11 of the banknote processing machine 10 illustrated in FIG. 1. FIG. 15 illustrates a state where the restricting member 470 is at the banknote bundle receiving position.

Figure 21:
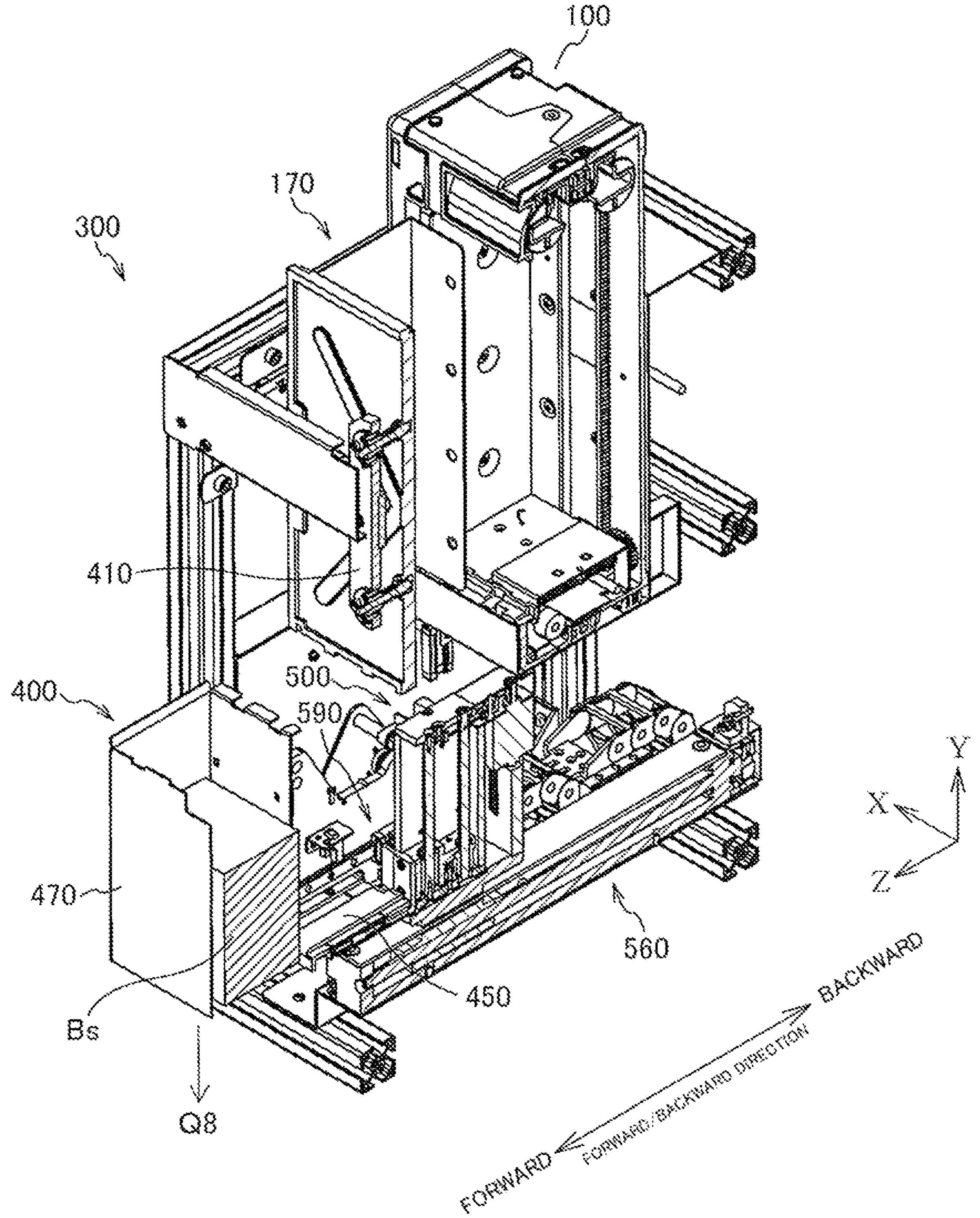
FIG. 21 is a sectional perspective view for explaining a sequence of operations of the banknote storage handling device.

As illustrated in FIG. 15, the banknote bundle movement mechanism 400 includes the loading table retraction mechanism 590 that moves the loading table lifting/lowering mechanism 500 supporting the loading table 450 back and forth between an advanced banknote bundle holding position (FIG. 20) and a retracted retreat position (FIG. 21) (in a range P2 in FIG. 15) relative to the restricting member 470 and independently thereof. The loading table retraction mechanism 590 (not illustrated in FIG. 21) retracts the loading table 450 having moved to the banknote bundle discharge position, from the paper sheet bundle discharge position independently of the restricting member 470 as illustrated in FIG. 21.

The banknote bundle holding position is a position where the loading table 450 can be lifted and lowered in the restricting member 470 and is a position where the loading table 450 holds banknote bundles in the restricting member 470. The retreat position is a position where the loading table 450 cannot be lifted and lowered in the restricting member 470 and is a position where the support of banknote bundles loaded on the loading table 450 is lost as illustrated in FIG. 21. FIG. 15 illustrates a state where the loading table 450 and the loading table movement mechanism 560 are at the banknote bundle holding position with respect to the restricting member 470.

The loading table retraction mechanism 590 is configured in a nested manner in the loading table movement mechanism 560.

<<<Loading Table Movement Mechanism>>>

As illustrated in FIG. 15, the banknote bundle movement mechanism 400 includes a holding member 561 that holds the restricting member 470 and the loading table retraction mechanism 590, and a ball screw mechanism 567 that moves the holding member 561 back and forth in the forward/backward direction between the banknote bundle receiving position and the banknote bundle discharge position (in the range P1 in the drawing).

The holding member 561 is arranged behind the restricting member 470. The holding member 561 includes a pair of side plates 563 extending backward from both ends in the width direction of the restricting member 470 and forming a space for accommodating the housing 525 of the first lifting/lowering mechanism 510 and the loading table retraction mechanism 590 between these members (only the side plate on the other end in the width direction is illustrated in FIG. 15). The holding member 561 also includes an attachment portion 565 for connecting the side plates 563 to each other at backward lower parts of the side plates 563 and attaching the side plates 563 to a nut member 569 of the ball screw mechanism 567.

The side plates 563 support the restricting member 470 in such a manner that the restricting member 470 moves back and forth in the forward/backward direction integrally with the side plates 563. The loading table lifting/lowering mechanism 500 is supported by the side plates 563 via the loading table retraction mechanism 590 and moves back and forth in the forward/backward direction integrally with the side plates 563.

The ball screw mechanism 567 is arranged at the lower end (the lowermost portion) of the handling device 300. The ball screw mechanism 567 schematically includes a screw shaft member 571 having an axis extending in the forward/backward direction, and the nut member 569 moving back and forth along the screw shaft according to rotation of the screw shaft member 571. The nut member 569 included in the ball screw mechanism 567 is fixed to a lower part of the attachment portion 565.

Figure 16:
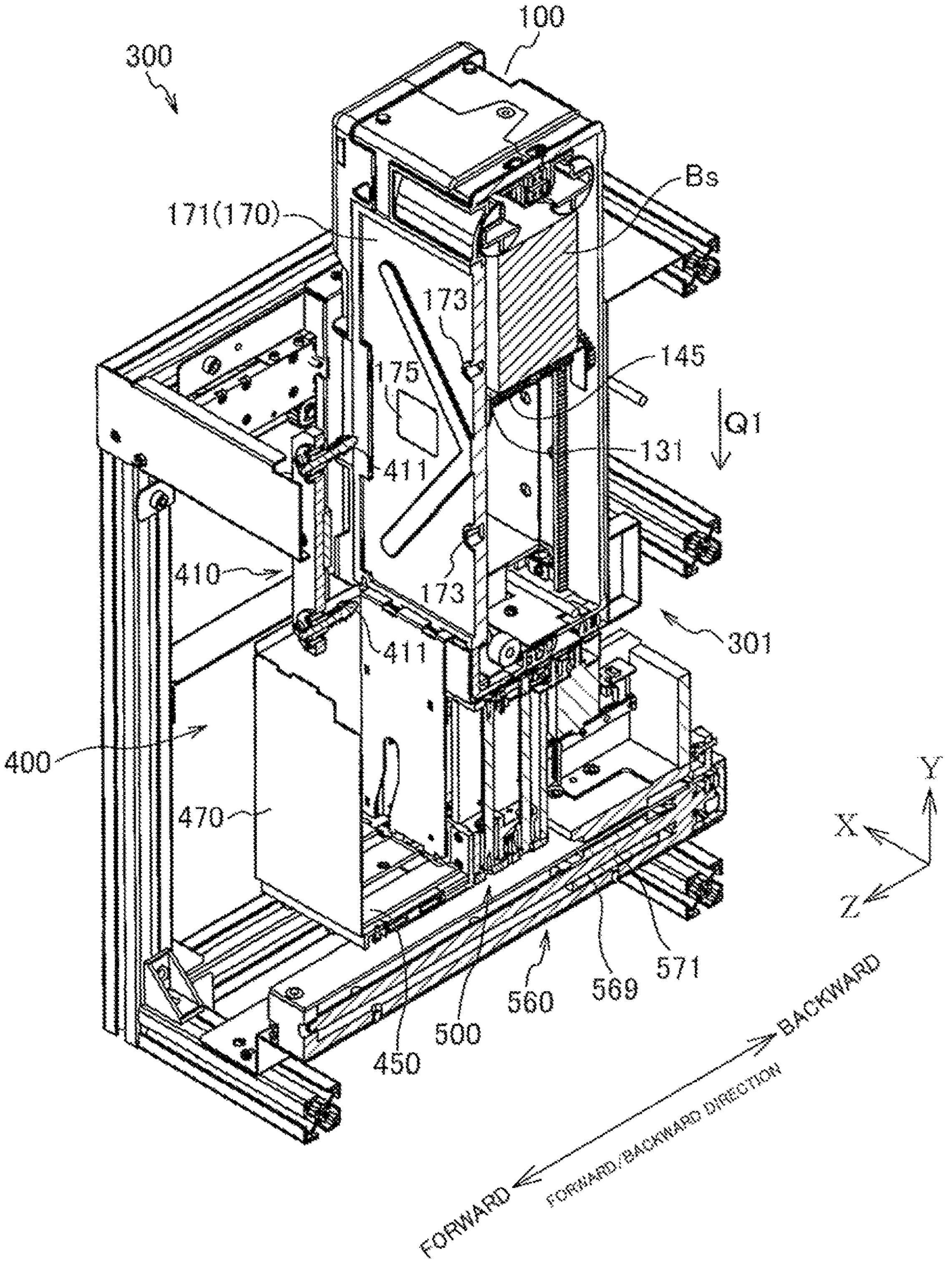
FIG. 16 is a sectional perspective view for explaining a sequence of operations of the banknote storage handling device.

As illustrated in FIG. 16, the screw shaft member 571 extends to the front end of the handling device 300.

<<<Loading Table Retraction Mechanism>>>

As illustrated in FIG. 15, the loading table retraction mechanism 590 schematically includes a rack gear 591 attached at an appropriate place on one side face (on one side face in the width direction in the present example) of the housing 525 of the first lifting/lowering mechanism 510 and having a gear part extending in the forward/backward direction, and a pinion gear 593 meshing with the gear part of the rack gear 591 and supported about an axis to be forward and reversely rotatable by the side plates (not illustrated) of the holding member 561.

Sliders 595, 595, . . . are attached to each side face in the width direction of the housing 525. Guide rails 597 and 597 extending in the forward/backward direction are fixed to the side plates 563 arranged on both ends in the width direction, respectively. The sliders 595, . . . move back and forth in the forward/backward direction by being guided by the guide rails 597 and 597.

The rack gear 591 moves back and forth relative to the side plates 563 according to rotational driving of the pinion gear 593. Therefore, the loading table 450 and the loading table lifting/lowering mechanism 500 move back and forth relative to the loading table movement mechanism 560 and the restricting member 470 along with the rack gear 591 and the sliders 595,

[Explanations of Overall Operation]

FIGS. 16 to 21 are sectional perspective views for explaining a sequence of operations of the banknote storage handling device. These drawings correspond to a cross section along A8-A8 in FIG. 9(*b*). The following explanations assume that the banknote storage 100 is set in the receiving portion 301 of the handling device 300 and that the banknote storage 100 is unlocked.

As illustrated in FIG. 16, in the state where the banknote storage 100 is set in the receiving portion 301, the loading plate 131 is in a state where stacked banknote bundles are elastically biased upward by the elastic biasing force of the coil spring 145. The restricting member 470 is on standby at the banknote bundle receiving position, and the loading table 450 is at the banknote bundle holding position where it can be lifted and lowered in the restricting member 470.

When the banknote storage 100 is unlocked, the driven mechanism 160 of the banknote storage 100 is driven by application of a driving force from the external driving mechanism 310 (FIG. 4(*b*)) to lower the loading plate 131 in the direction of an arrow Q1 in the drawing. The loading plate 131 is lowered to the lowest position as illustrated in FIG. 17.

Figure 17:
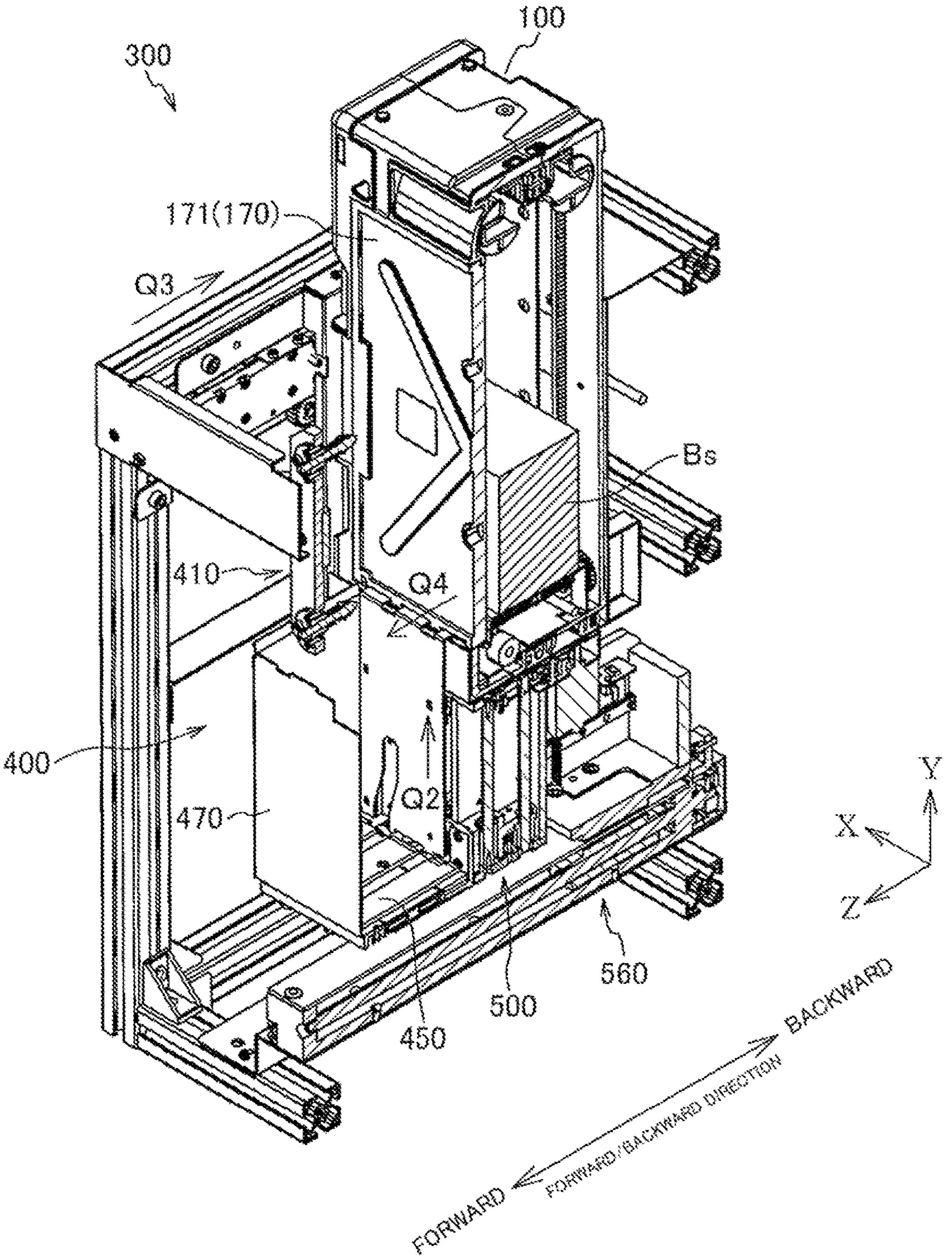
FIG. 17 is a sectional perspective view for explaining a sequence of operations of the banknote storage handling device.

The loading table lifting/lowering mechanism 500 lifts the loading table 450 (in the direction of an arrow Q2 in FIG. 17). As illustrated in FIG. 18, the loading table 450 is lifted up to the lifted position (the standby position).

The lid unit opening/closing mechanism 410 moves from the spaced position spaced from the lid body 171 toward the approaching position where the lid body 171 is latched (in the direction of an arrow Q3 in FIG. 17). When the lid unit opening/closing mechanism 410 moves to the approaching position, the latching protrusions 411 and 411 latch the latched holes 173 and 173 of the lid body 171, and power is supplied to the electromagnets 413 and 413 (see FIG. 12) to magnetically attract the stuck portions 175 and 175.

The lid unit opening/closing mechanism 410 moves to the spaced position (in the direction of an arrow Q4 in FIG. 17) in the state where the lid unit 170 is latched and stuck, and moves the lid unit 170 to the open position illustrated in FIG. 18. The banknote bundles Bs loaded on the loading plate 131 in FIG. 17 are taken forward from the banknote bundle storage void 111 by the banknote bundle moving member 177 (particularly the pressing portion 181) protruded from the lid body 171 with the movement of the lid unit 170. As a result, the banknote bundles Bs are transferred onto the loading table 450 as illustrated in FIG. 18. Since the lower end edge of the pressing portion 181 is positioned below the upper face of the loading plate 131 (see FIG. 19), the banknote bundle moving member 177 moves the entire banknote bundles Bs to the outside of the banknote bundle storage void 111 without a banknote positioned at the bottom of the banknote bundles Bs left in the banknote bundle storage void 111.

The loading table 450 having received the banknote bundles Bs from the banknote storage 100 is lowered (in the direction of an arrow Q5 in FIG. 18) by driving of the loading table lifting/lowering mechanism 500, to be lowered to the lowered position illustrated in FIG. 19. Associated with the lowering of the loading table 450, the restricting member 470 receives the banknote bundles Bs in a void provided therein from the upper face opening.

The loading table 450 and the restricting member 470 having loaded the banknote bundles Bs thereon is advanced in the direction of an arrow Q6 in the drawing from the banknote bundle receiving position illustrated in FIG. 19 by an operation of the loading table movement mechanism 560, to move to the banknote bundle discharge position illustrated in FIG. 20.

As illustrated in FIG. 14, the loading table 450 and the pantograph mechanism 530 are at a position not interfering with the restricting member 470 in the upward/downward direction (the Y direction). With the operation of the loading table retraction mechanism 590 illustrated in FIG. the loading table 450 (and the loading table lifting/lowering mechanism 500) relatively and independently retracts to the retreat position with respect to the restricting member 470 (in the direction of an arrow Q7 in the drawing) as illustrated in FIG. 20. The restricting plates 473 of the restricting member 470 press the back end face of the banknote bundles Bs and restrict the position of the banknote bundles Bs to cause the banknote bundles Bs to remain at the paper sheet bundle discharge position when the loading table 450 retracts independently of the restricting member 470. The engaging protrusions 479, 479, formed on the lower ends of the restricting plates 473 move inside the grooves 451, 451, of the loading table 450 (see FIG. 15), and leave the entire banknote bundles Bs including the banknote positioned at the bottom of the banknote bundles Bs at the banknote bundle discharge position.

As a result, the banknote bundles Bs lose the support and drop from the lower face opening of the restricting member 470 (in the direction of an arrow Q8 in FIG. 21) while kept in the bundles, and are discharged to the banknote bundle discharge position located below the restricting member 470. Since the banknote bundles are discharged to the discharge position with gravity, the mechanisms related to discharge of the banknote bundles can be simplified.

[Summary of Aspect Examples of the Present Invention, Functions, and Effects Thereof]

<First Aspect>

A paper sheet storage handling device (the banknote storage handling device 300) according to the present aspect includes the receiving portion 301 that removably receives a paper sheet storage (the banknote storage 100) having paper sheets stored therein in a stacked state, and a paper sheet bundle movement mechanism (the banknote bundle movement mechanism 400) that moves the paper sheet bundles Bs, which are exposed by opening the lateral opening 113 of the paper sheet storage in a state where the paper sheet storage received in the receiving portion is stopped at a predetermined paper sheet storage stop position, outward from the lateral opening.

The paper sheet storage includes the casing 110 that has a paper sheet bundle storage void (the banknote bundle storage void 111) inside and that includes the lateral opening on one side face, the lid unit 170 that opens and closes the lateral opening when moving back and forth in an inward/outward direction of the lateral opening, the loading plate 131 that is always biased in a lifting direction to hold the paper sheet bundles in a stacked manner while being supported to be capable of being lifted and lowered in the paper sheet bundle storage void, and the driven mechanism 160 that receives an external driving force for lowering the loading plate against a biasing force.

The lid unit includes the lid body 171 that moves back and forth between a closed position to close the lateral opening of the casing and an open position spaced outward from the lateral opening to open the lateral opening, and a paper sheet bundle moving member (the banknote bundle moving member 177) that is provided in a protruded manner from the lid body toward an inside of the lateral opening and that collectively moves the paper sheet bundles in the paper sheet bundle storage void from the lateral opening to outside the casing when moving outward along with the lid body.

The paper sheet bundle movement mechanism includes the lid unit opening/closing mechanism 410 that moves back and forth between the spaced position spaced from the lid body of the paper sheet storage located in the receiving portion and the approaching position where the lid body is latched, and that moves the lid unit to the open position by moving to the spaced position in a state where the lid body is latched, the loading table 450 that is configured to receive and load the paper sheet bundles moved outward from the lateral opening by the paper sheet bundle moving member in accordance with movement of the lid unit to the open position when at a lifted standby position, and to be capable of being lowered from the standby position to a lowered position in a state where the paper sheet bundles are loaded thereon, and the loading table movement mechanism 560 that moves the loading table located at the lowered position to a predetermined paper sheet bundle discharge position.

Each of the mechanisms included in the paper sheet storage handling device according to the present aspect is manufactured by combination of machine elements such as a gear, a screw, a cam, a link, and a spring. According to the present aspect, banknotes can be automatically taken out without using image processing or the like, and therefore devices related to automatic taking-out of banknotes can be simplified and downscaled.

<Second Aspect>

The paper sheet storage handling device (the banknote storage handling device 300) according to the present aspect includes the external driving mechanism 310 that couples to the driven mechanism 160 and transmits the external driving force thereto when the paper sheet storage (the banknote storage 100) is at the paper sheet storage stop position.

According to the present aspect, it is unnecessary to install a mechanism for generating a driving force in the banknote storage and therefore the configuration of the banknote storage can be simplified.

<Third Aspect>

The paper sheet storage handling device (the banknote storage handling device 300) according to the present aspect includes the restricting member 470 that is configured to restrict a side face position of the paper sheet bundles Bs received by the loading table 450 and to be movable to the paper sheet bundle discharge position along with the loading table by the loading table movement mechanism 560, and the loading table retraction mechanism 590 that retracts the loading table having moved to the paper sheet bundle discharge position from the paper sheet bundle discharge position independently of the restricting member, and the restricting member restricts the paper sheet bundles to the paper sheet bundle discharge position when the loading table is independently retracted.

In the present aspect, the restricting member restricts the position of the paper sheet bundles loaded on the loading table to the paper sheet bundle discharge position when the loading table having moved to the paper sheet bundle discharge position retracts from the paper sheet bundle discharge position independently of the restricting member. Therefore, the paper sheet bundles can be dropped to the paper sheet bundle discharge position.

<Fourth Aspect>

In the paper sheet storage handling device (the banknote storage handling device 300) according to the present aspect, the lid unit opening/closing mechanism 410 includes a sticking unit (the electromagnets 413) that sticks to and holds the stuck portions 175 provided on an outer face of the lid body 171.

That is, the lid unit opening/closing mechanism moves the lid unit 170 to the open position by moving to the spaced position in a state where the sticking unit sticks to and holds the stuck portion. An electromagnet using a magnetic force, a suction cup using air pressure (vacuum suction), or the like can be used as the sticking unit.

According to the present aspect, the components related to opening of the lid unit can be arranged on an outer face (the front face) of the lid body by use of the sticking unit for movement of the lid unit. Furthermore, positioning of the lid unit opening/closing mechanism required to move the lid unit and the paper sheet storage can be easily performed.

REFERENCE SIGNS LIST

Ax1, Ax2 rotation center axis, 10 banknote processing machine, 11 banknote inlet, 100 banknote storage, 110 casing, 111 banknote bundle storage void, 113 lateral opening, 115 lower end space, 117 partition plate, 121 receiving port, 123 banknote set unit, 125 end support member, 127 pressing member, 131 loading plate, 131*a* gear support portion, 140 loading plate advance/retract mechanism, 141 rack gear, 143 pinion gear, 143*a* rotation shaft, 145 coil spring, 147 guide rail, 149 slider, 160 driven mechanism, 161 constant load spring, 161*a* one end, 161*b* the other end, 163 drum, 163*a* rotation shaft, 165 driven gear, 167 roller, 170 lid unit, 171 lid body, 173 latched hole, 175 stuck portion, 177 banknote bundle moving member, 179 guide part, 181 pressing part, 181*a* distal end edge, 183 latched click, 190 locking/unlocking unit, 191 lock, 191*a* front face, 193 engaged portion, 195 keyhole, 195*a* guide groove, 197 cam piece, 201 actuating member, 203 pin, 205 coupling piece, 207 transmission shaft, 209 coupling piece, 211 pin, 221 lock plate, 223 latch portion, 225 long hole, 300 banknote storage handling device, 301 receiving portion, 303 upper face opening, 305 frame body, 310 external driving mechanism, 311 driving motor, 313 driving gear, 315 transmission gear, 320 locking/unlocking device, 330 key unit, 331 key, 331*a* key body, 331*b* protrusion, 331*c* distal end edge, 333 key rotation motor, 333*a* body part, 333*b* output shaft, 335 base member, 335*a* motor insertion hole, 335*b* shaft hole, 337 arm member, 337*a* slide pin, 341 bracket, 343 nut, 345 shoulder bolt, 345*a* shank, 347 helical compression spring, 351 centering member, 351*a* distal end opening, 353 engaging hole, 355 key holding hole, 357 helical compression spring, 360 key movement mechanism, 361 key advancing/retracting motor, 363 pinion gear, 365 rack plate, 367 rack gear, 369 long hole, 371 helical extension spring, 400 banknote bundle movement mechanism, 410 lid unit opening/closing mechanism, 411 latching protrusion, 413 electromagnet, 415 support member, 416 support frame, 417 rack gear, 419 pinion gear, 421 driving unit, 423 motor, 425 gear group, 427 output gear, 429 driving transmission shaft, 431 driving pulley, 433 driven pulley, 435 belt member, 450 loading table, 451 groove, 453 pantograph housing portion, 455 engaging concave portion, 457 support piece, 459 long hole, 461 pivotally support portion, 470 restricting member, 471 guide plate, 473 restricting plate, 475 slit, 479 engaging protrusion, 500 loading table lifting/lowering mechanism, 510 first lifting/lowering mechanism, 511 lifting/lowering member, 513 support body, 515 pivotally support portion, 517 long hole, 519 ball screw, 521 nut, 523 screw shank, 523*a* one end, 525 housing, 527 driving unit, 530 pantograph mechanism, 531 first link piece, 533 guided pin, 535 pivotally support portion, 537 pin, 539 second link piece, 541 pin, 560 loading table movement mechanism, 561 holding member, 563 side plate, 565 attachment portion, 567 ball screw mechanism, 569 nut member, 571 screw shaft member, 590 loading table retraction mechanism, 591 rack gear, 593 pinion gear, 595 slider, 597 guide rail

The invention claimed is:

1. A paper sheet storage handling device comprising:

a receiving portion that removably receives a paper sheet storage having paper sheets stored therein in a stacked state; and a paper sheet bundle movement mechanism that moves paper sheet bundles, which are exposed by opening a lateral opening of the paper sheet storage in a state where the paper sheet storage received in the receiving portion is stopped at a predetermined paper sheet storage stop position, outward from the lateral opening, wherein the paper sheet storage includes a casing that has a paper sheet bundle storage void inside and that includes the lateral opening on one side face, a lid unit that opens and closes the lateral opening when moving back and forth in an inward/outward direction of the lateral opening, a loading plate that is always biased in a lifting direction to hold the paper sheet bundles in a stacked manner while being supported to be capable of being lifted and lowered in the paper sheet bundle storage void, and a driven mechanism that receives an external driving force for lowering the loading plate against a biasing force, the lid unit includes a lid body that moves back and forth between a closed position to close the lateral opening of the casing and an open position spaced outward from the lateral opening to open the lateral opening, and a paper sheet bundle moving member that is provided in a protruded manner from the lid body toward an inside of the lateral opening and that collectively moves the paper sheet bundles in the paper sheet bundle storage void from the lateral opening to outside the casing when moving outward along with the lid body, and the paper sheet bundle movement mechanism includes a lid unit opening/closing mechanism that moves back and forth between a spaced position spaced from the lid body of the paper sheet storage located in the receiving portion and an approaching position where the lid body is latched, and that moves the lid unit to the open position by moving to the spaced position in a state where the lid body is latched, a loading table that is configured to receive and load the paper sheet bundles moved by the paper sheet bundle moving member outward from the lateral opening in accordance with movement of the lid unit to the open position when at a lifted standby position, and to be capable of being lowered from the standby position to a lowered position in a state where the paper sheet bundles are loaded thereon, and a loading table movement mechanism that moves the loading table located at the lowered position to a predetermined paper sheet bundle discharge position.

2. The paper sheet storage handling device according to claim 1, including an external driving mechanism that couples to the driven mechanism and transmits the external driving force thereto when the paper sheet storage is at the paper sheet storage stop position.

3. The paper sheet storage handling device according to claim 1, comprising:

a restricting member that is configured to restrict a side face position of the paper sheet bundles received by the loading table and to be movable to the paper sheet bundle discharge position along with the loading table by the loading table movement mechanism; and a loading table retraction mechanism that retracts the loading table having moved to the paper sheet bundle discharge position from the paper sheet bundle discharge position independently of the restricting member, wherein the restricting member restricts the paper sheet bundles to the paper sheet bundle discharge position when the loading table is independently retracted.

4. The paper sheet storage handling device according to claim 1, wherein the lid unit opening/closing mechanism includes a sticking unit that sticks to and holds a stuck portion provided on an outer face of the lid body.

5. The paper sheet storage handling device according to claim 2, comprising:

a restricting member that is configured to restrict a side face position of the paper sheet bundles received by the loading table and to be movable to the paper sheet bundle discharge position along with the loading table by the loading table movement mechanism; and a loading table retraction mechanism that retracts the loading table having moved to the paper sheet bundle discharge position from the paper sheet bundle discharge position independently of the restricting member, wherein the restricting member restricts the paper sheet bundles to the paper sheet bundle discharge position when the loading table is independently retracted.

6. The paper sheet storage handling device according to claim 2, wherein the lid unit opening/closing mechanism includes a sticking unit that sticks to and holds a stuck portion provided on an outer face of the lid body.

7. The paper sheet storage handling device according to claim 3, wherein the lid unit opening/closing mechanism includes a sticking unit that sticks to and holds a stuck portion provided on an outer face of the lid body.

8. The paper sheet storage handling device according to claim 5, wherein the lid unit opening/closing mechanism includes a sticking unit that sticks to and holds a stuck portion provided on an outer face of the lid body.

* * * * *